United States Patent
Ganzer et al.

(10) Patent No.: US 11,745,389 B2
(45) Date of Patent: Sep. 5, 2023

(54) MELTING SYSTEM INCLUDING FLOW GUIDE MEMBERS

(71) Applicant: NORDSON CORPORATION, Westlake, OH (US)

(72) Inventors: Charles P. Ganzer, Cumming, GA (US); Robert J. Woodlief, Suwanee, GA (US); Hubert Kufner, Luneburg (DE); Leslie J. Varga, Cumming, GA (US); Gerd Brockman, Luneburg (DE); Laurence B. Saidman, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 173 days.

(21) Appl. No.: 16/760,104

(22) PCT Filed: Oct. 26, 2018

(86) PCT No.: PCT/US2018/057668
§ 371 (c)(1),
(2) Date: Apr. 29, 2020

(87) PCT Pub. No.: WO2019/089370
PCT Pub. Date: May 9, 2019

(65) Prior Publication Data
US 2020/0331168 A1    Oct. 22, 2020

Related U.S. Application Data

(60) Provisional application No. 62/579,825, filed on Oct. 31, 2017.

(51) Int. Cl.
  *B29B 13/02* (2006.01)
  *B05C 11/10* (2006.01)
  *B29K 105/00* (2006.01)

(52) U.S. Cl.
  CPC ........ *B29B 13/022* (2013.01); *B05C 11/1042* (2013.01); *B29K 2105/0097* (2013.01)

(58) Field of Classification Search
  CPC .......... B29B 13/022; B29K 2105/0097; B05C 11/1042
  See application file for complete search history.

(56) References Cited

U.S. PATENT DOCUMENTS 3,964,645 A * 6/1976 Scholl .................... F04C 13/002
                                                 222/325
3,981,416 A * 9/1976 Scholl .................... B29B 13/022
                                                 222/146.1

(Continued)

FOREIGN PATENT DOCUMENTS

| CN | 105195387 A | 12/2015 |
| JP | 11-165112 A | 6/1999 |

*Primary Examiner* — Vishal Pancholi
(74) *Attorney, Agent, or Firm* — BakerHostetler

(57) ABSTRACT

A melting unit melts a solid material into a molten material. The melt unit includes a reservoir, a hopper, and a melt grid disposed between the hopper and the reservoir. The melt grid heats the solid material into the molten material such that the molten material flows from the hopper to the reservoir. The melt unit includes a plurality of guide members, where the molten material flows through plurality of flow channels defined by the melt grid and along the plurality of guide members as the molten material flows from the hopper to the reservoir.

36 Claims, 21 Drawing Sheets

(56) References Cited

U.S. PATENT DOCUMENTS

| | | | | |
|---|---|---|---|---|
| 4,474,311 A | * | 10/1984 | Petrecca | B29B 13/022 |
| | | | | 126/343.5 R |
| 4,485,942 A | * | 12/1984 | Petrecca | B29B 13/022 |
| | | | | 219/424 |
| 4,666,066 A | * | 5/1987 | Boccagno | B29B 13/022 |
| | | | | 219/421 |
| 4,667,850 A | | 5/1987 | Scholl et al. | |
| 4,821,922 A | * | 4/1989 | Miller | G01G 17/04 |
| | | | | 177/184 |
| 5,509,954 A | | 4/1996 | Derian et al. | |
| 5,657,904 A | | 8/1997 | Frates et al. | |
| 5,814,790 A | * | 9/1998 | Bondeson | B29B 13/022 |
| | | | | 219/424 |
| 6,175,101 B1 | | 1/2001 | Miller et al. | |
| 7,015,427 B1 | | 3/2006 | Jeter | |
| 7,626,143 B2 | * | 12/2009 | Miller | B05C 11/1007 |
| | | | | 219/421 |
| 9,304,028 B2 | * | 4/2016 | Clark | G01F 23/26 |
| 9,770,843 B2 | * | 9/2017 | Varga | B05C 5/0237 |
| 2013/0112279 A1 | | 5/2013 | Ross et al. | |

\* cited by examiner

MELTING SYSTEM INCLUDING FLOW GUIDE MEMBERS

CROSS REFERENCE TO RELATED APPLICATIONS

This application is a U.S. National Stage Application of PCT International Patent App. No. PCT/US2018/057668, filed Oct. 26, 2018, which claims the benefit of U.S. Provisional Patent App. No. 62/579,825, filed Oct. 31, 2017, the entire disclosures of both of which are hereby incorporated by reference as if set forth in their entireties herein.

TECHNICAL FIELD

The present disclosure relates to a melting system including guide members over which molten material flows to reduce aeration of the material.

BACKGROUND

Conventional melting systems include a melt grid positioned below a hopper, a reservoir positioned below the melt grid, a pump coupled to a reservoir, and an applicator coupled to the pump. The melt grid exposes solid material stored in the hopper to an elevated temperature, which converts the solid material into a molten liquid. The melt grid is typically submerged in the molten liquid within the reservoir. The molten liquid is gravity fed to the reservoir where the pump transports the molten liquid to the applicator. The applicator deposits the molten liquid onto a substrate, such as a nonwoven or other material.

In some examples, the melt grid is located above the molten liquid pool that resides within the reservoir. As molten material, such as liquid adhesive, then flows from the melt grid to the reservoir pool, it can develop individual streams that extend from passages through the melt grid down to the surface of the reservoir pool. As these individual adhesive streams contact the reservoir pool, they can swirl and overlap, thus entraining pockets of air within the adhesive. This entrained air tends to remain trapped within the adhesive due to the viscous nature of hot melt adhesive. To ensure accurate adhesive pressure control and consistent performance of the melting system, it is desirable to prevent or remove air from the adhesive. Any air that becomes entrained in the adhesive can negatively impact the quality of patterns produced by the applicator. Specifically, upon dispensing the adhesive, entrained air can rapidly expand and cause adhesive splitting, gaps in adhesive patterns, or inaccurate adhesive pattern placement. This presents many problems, as accurate adhesive patterns are critical in nonwoven product and other applications.

Therefore, there is a need for a melting system that reduces the amount of air that becomes trapped in the adhesive.

SUMMARY

An embodiment of the invention is a melt unit including a reservoir for receiving molten material, a hopper for receiving solid material, and a melt grid disposed between the hopper and the reservoir, where the melt grid heats the solid material into the molten material. The melt grid includes a plurality of elongated melting rails that extend along a longitudinal direction, where each of the plurality of melting rails is spaced apart along a lateral direction that is perpendicular to the longitudinal direction, and a plurality of flow channels, where each of the plurality of flow channels extends between a respective two melting rails of the plurality of elongated melting rails. The melt grid also includes a plurality of guide members, where each of the plurality of guide members is positioned below the plurality of flow channels and the plurality of elongated melting rails along a vertical direction that is perpendicular to the lateral and longitudinal directions, such that the molten material flows through the plurality of flow channels and along respective flow surfaces of the plurality of guide members as the molten material flows from the hopper to the reservoir.

Another embodiment of the invention is a melt unit including a reservoir for receiving molten material, the reservoir including a base and a top opposite the base along a vertical direction. The top of the reservoir defines an outer wall that defines an inner surface, the reservoir further including a plurality of support bars attached to the inner surface of the outer wall and a plurality of guide members extending upward from the plurality of support bars along the vertical direction, where the plurality of guide members are spaced apart along a lateral direction that is perpendicular to the vertical direction and the plurality of support bars are spaced apart along a longitudinal direction that is perpendicular to the vertical and lateral directions. The melt unit also includes a hopper for receiving solid material and a melt grid disposed between the hopper and the reservoir, where the melt grid heats the solid material into the molten material. The melt grid includes a plurality of elongated melting rails that extend along the longitudinal direction and are spaced apart along the lateral direction, and a plurality of flow channels, where each of the plurality of flow channels extends between two melting rails of the plurality of elongated melting rails. The plurality of guide members are positioned such that the molten material flows through the plurality of flow channels and along the plurality of guide members as the molten material flows to the reservoir.

Another embodiment of the invention is a melt unit including a reservoir for receiving molten material, the reservoir including an outer wall that has an inner surface and a guide member that extends from a first part of the inner surface to a second part of the inner surface that is opposite the first part. The melt unit also includes a hopper for receiving solid material, and a melt grid disposed between the hopper and the reservoir, where the melt grid heats the solid material into the molten material. The melt grid includes a plurality of elongated melting rails that extend along a longitudinal direction and are spaced apart along a lateral direction that is perpendicular to the longitudinal direction and a plurality of flow channels, where each of the plurality of flow channels extends between two melting rails of the plurality of elongated melting rails. The melt grid further includes an opening that is in fluid communication with the reservoir and each of the plurality of flow channels. The guide member is positioned below the opening along a transverse direction that is perpendicular to the longitudinal and lateral directions and aligned with the opening along the transverse direction. Molten material flows through the plurality of flow channels, through the opening, and along the guide member as the molten material flows to the reservoir.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
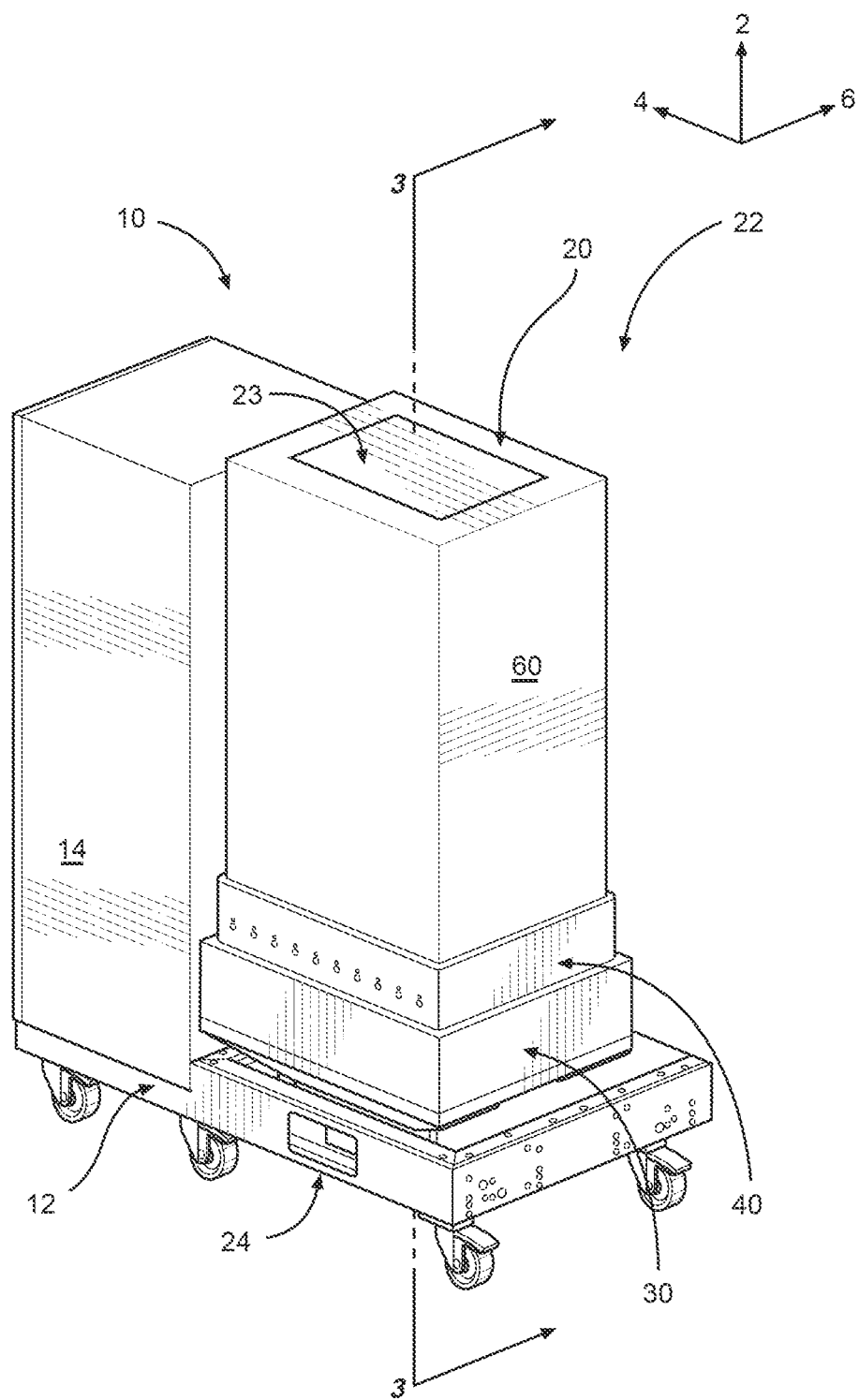
FIG. 1 is a perspective view of a melting system according to an embodiment of the present disclosure.

Described herein is a melting system 10 that includes a melt grid 40, 100 for converting a solid material P, such as a solid polymer material, into a molten material M, such as a molten polymer material or adhesive. The melting system 10 includes guide members 154, 254, 354, 454, and/or 500 along which the molten material M flows as it moves from the melt grid 40, 100 to a reservoir 30. Certain terminology is used to describe the melting system 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the melting system 10 and related parts thereof. The words "forward" and "rearward" refer to directions in a longitudinal direction 6 and a direction opposite the longitudinal direction 6 along the melting system 10 and related parts thereof. The terminology includes the above-listed words, derivatives thereof, and words of similar import.

Unless otherwise specified herein, the terms "vertical," "lateral," and "longitudinal" are used to describe the orthogonal directional components of various components of the melting system 10, as designated by the vertical direction 2, lateral direction 4, and longitudinal direction 6. It should be appreciated that while the lateral and longitudinal directions 4 and 6 are illustrated as extending along a horizontal plane, and the vertical direction 2 is illustrated as extending along a vertical plane, the planes that encompass the various directions may differ during use.

Figure 2:
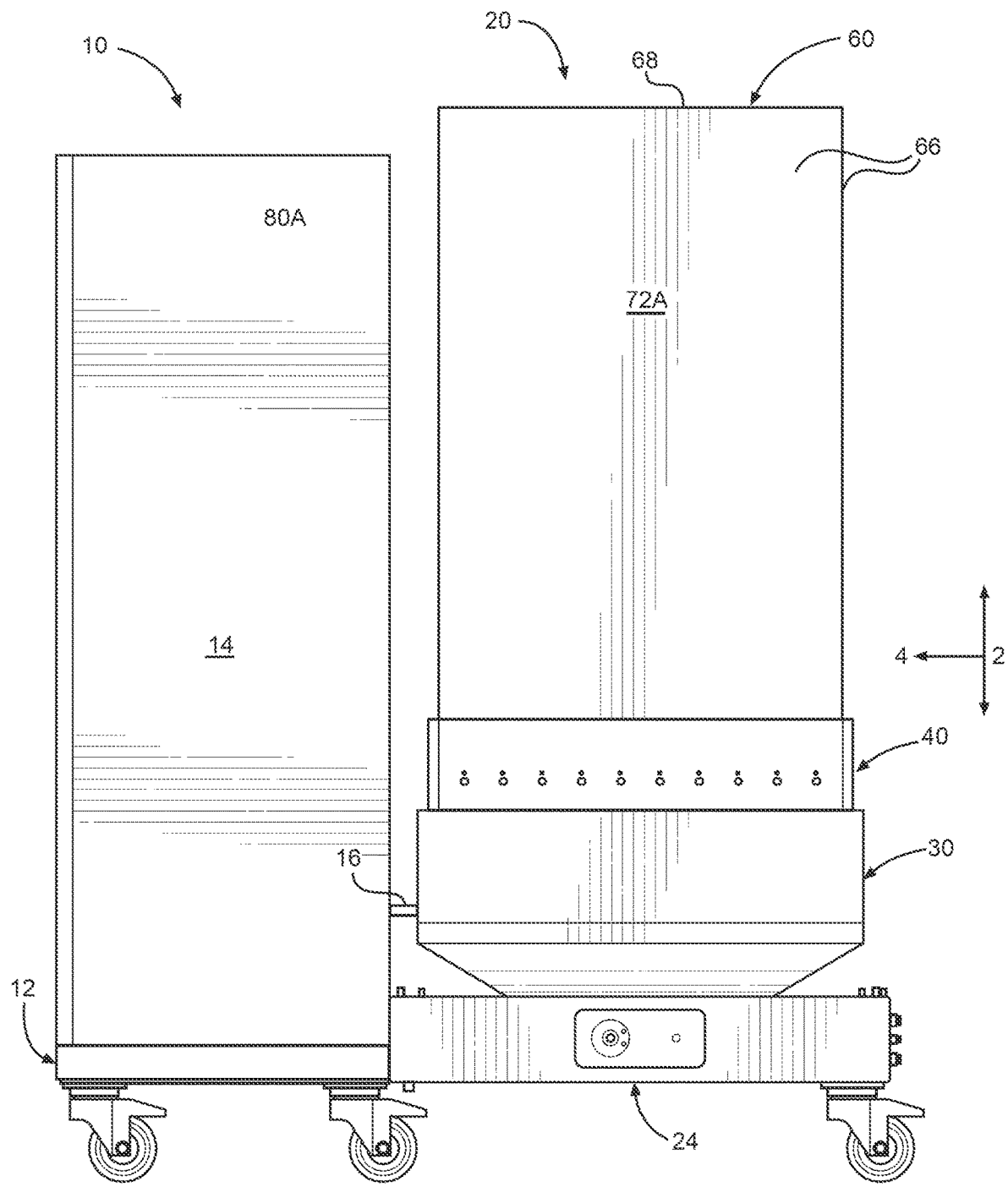
FIG. 2 is a side view of the melting system shown in FIG. 1.

Referring to FIGS. 1 and 2, an embodiment of the present disclosure includes a melting system 10 configured to melt and deliver a liquid, such as a molten polymer material P, which may be a thermoplastic material, downstream to dispensing equipment (not shown). The dispensing equipment can be used to apply the molten material onto a substrate. The substrate can be a nonwoven material used in hygiene or other applications such as paper and paperboard packaging or other product assembly applications involving adhesives. Alternatively, the substrate can include any materials where the application of a polymer material, such as an adhesive, is needed. The solid material P can be a pressure sensitive adhesive. However, it should be appreciated that melting system 10 can be adapted to process other polymer materials.

As shown in FIGS. 1 and 2, the melting system 10 generally includes a base frame 12 mounted on wheels (not numbered), a control unit 14 supported by one side of the base frame 12, and at least one melt unit. In accordance with the illustrated embodiment, the melt unit 20 is supported by the side of the base frame 12 opposite the control unit 14. The control unit 14 includes a cabinet that houses controllers, displays, user interfaces, etc., that an operator can use to control operation of the melting system 10. The control unit 14 is connected to the melt unit 20 via wired connectors 16. Though shown as including a single melt unit, the melting system 10 can include two or more melt units. The inventive principles as described herein can be scaled up or down in size depending on application requirements, such as for nonwoven or packaging applications.

Continuing with FIGS. 1 and 2, the melt unit 20 is supported by the base frame 12 and the underlying surface and extends upward along a vertical direction 2. The melt unit 20 and control unit 14, and thus the base frame 12, define the overall "footprint" of the melting system 10. As illustrated, the footprint is substantially rectilinear and extends along a lateral direction 4 and a longitudinal direction 6 that are perpendicular to each other. The lateral and longitudinal directions 4 and 6 are also perpendicular to the vertical direction 2.

Figure 3:
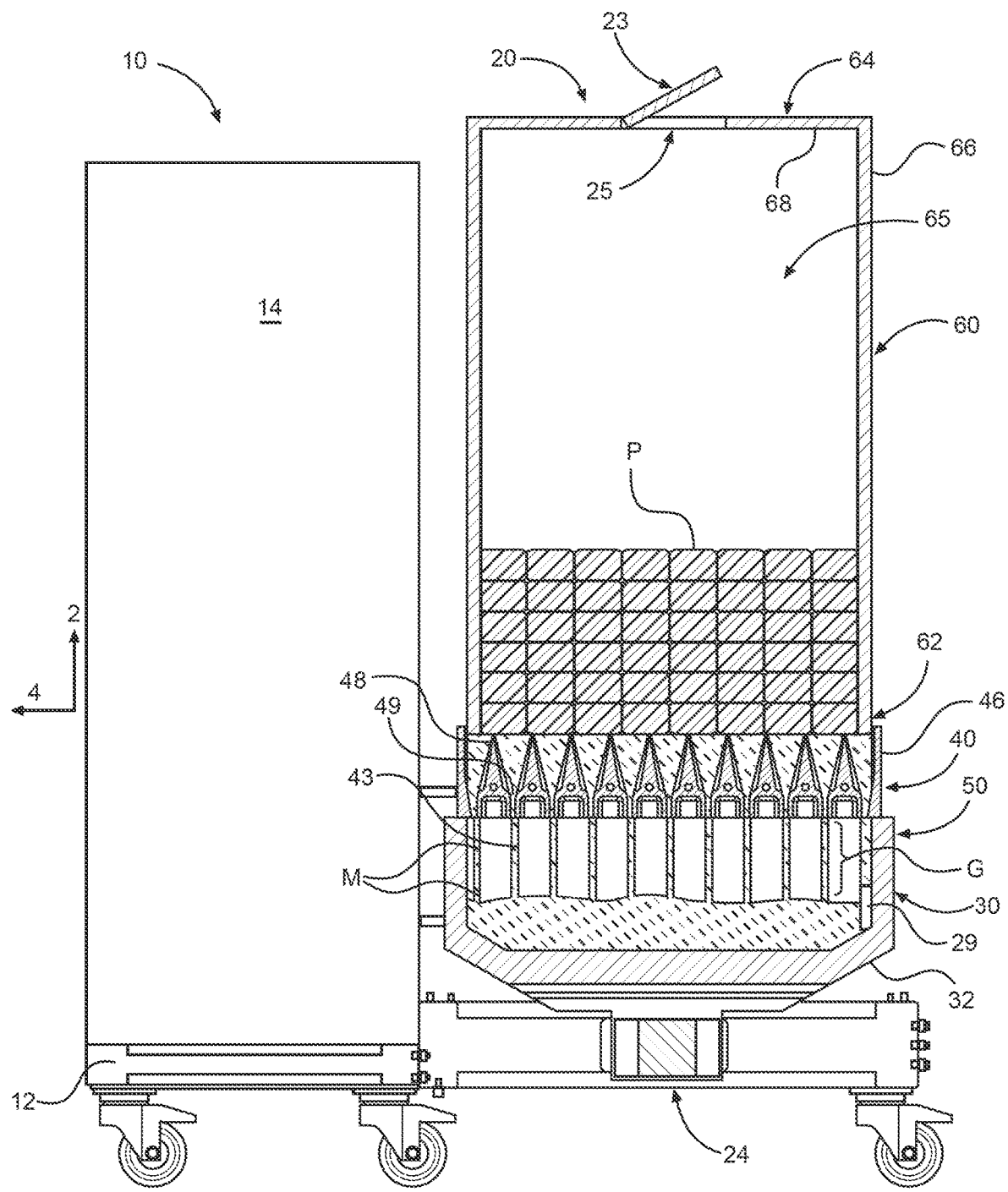
FIG. 3 is a cross-sectional view of a portion of the melting system shown in FIG. 1 taken along line 3-3.
Figure 21:
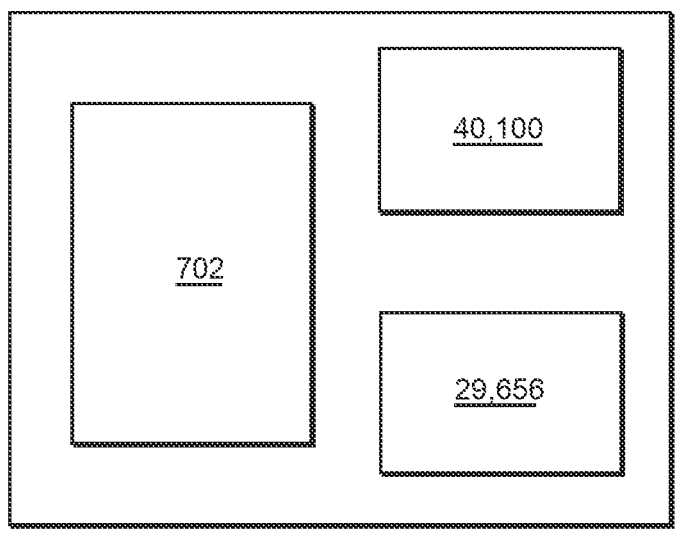
FIG. 21 is a schematic diagram of a control system for the melting system shown in FIG. 1.

Continuing with FIGS. 1-3, the melt unit 20 includes a pump assembly 24 above the base frame 12, a reservoir 30 coupled to the pump assembly 24, one or more sensors 29 positioned in the reservoir 30, a melt grid 40 above the reservoir 30, and the hopper 60 mounted above the melt grid 40. The melt unit 20 also includes a thermal isolation region 50 disposed between the reservoir 30 and the hopper 60. The melting system 10 includes a control system 700 that controls operations of the melt unit 20, as shown in FIG. 21. The control system 700 includes a controller 702 coupled to the one or more sensors 29 and the melt grid 40. The control system 700 is used to control flow of molten material from the melt grid 40 and into the reservoir 30 as explained below.

Referring to FIGS. 1-3, the thermal isolation region 50 creates a barrier between the molten material M, which is typically a polymer material, in the reservoir 30 and the solid material P in the hopper 60. The thermal isolation region 50 helps maintain the temperature in the hopper 60 below the melting temperature of the solid material P. For example, the thermal isolation region 50 helps maintains the solid material P in the hopper 60 at a first temperature that is lower than a second temperature of the molten material M in the reservoir 30 by creating a thermal barrier that minimizes heat transfer from the reservoir 30 to the hopper 60 through the melt grid 40. As shown in FIG. 3, the thermal isolation region 50 comprises the gap G between the melt grid 40 and the molten material M in reservoir 30. The thermal isolation region 50 can be any space or structure that creates a thermal barrier to minimize or even eliminate thermal migration from the molten material in the reservoir to the solid material P in the hopper. For instance, the thermal isolation region 50 may be an upper portion of the reservoir 30, as shown in FIG. 3. In another embodiment, the thermal isolation region 50 may comprise a separate component positioned between the reservoir 30 and the melt grid 40. In some instances, there may be a thermal isolation region 50 and/or separate component positioned between the hopper 60 and the melt grid 40 (not shown).

Figure 4:
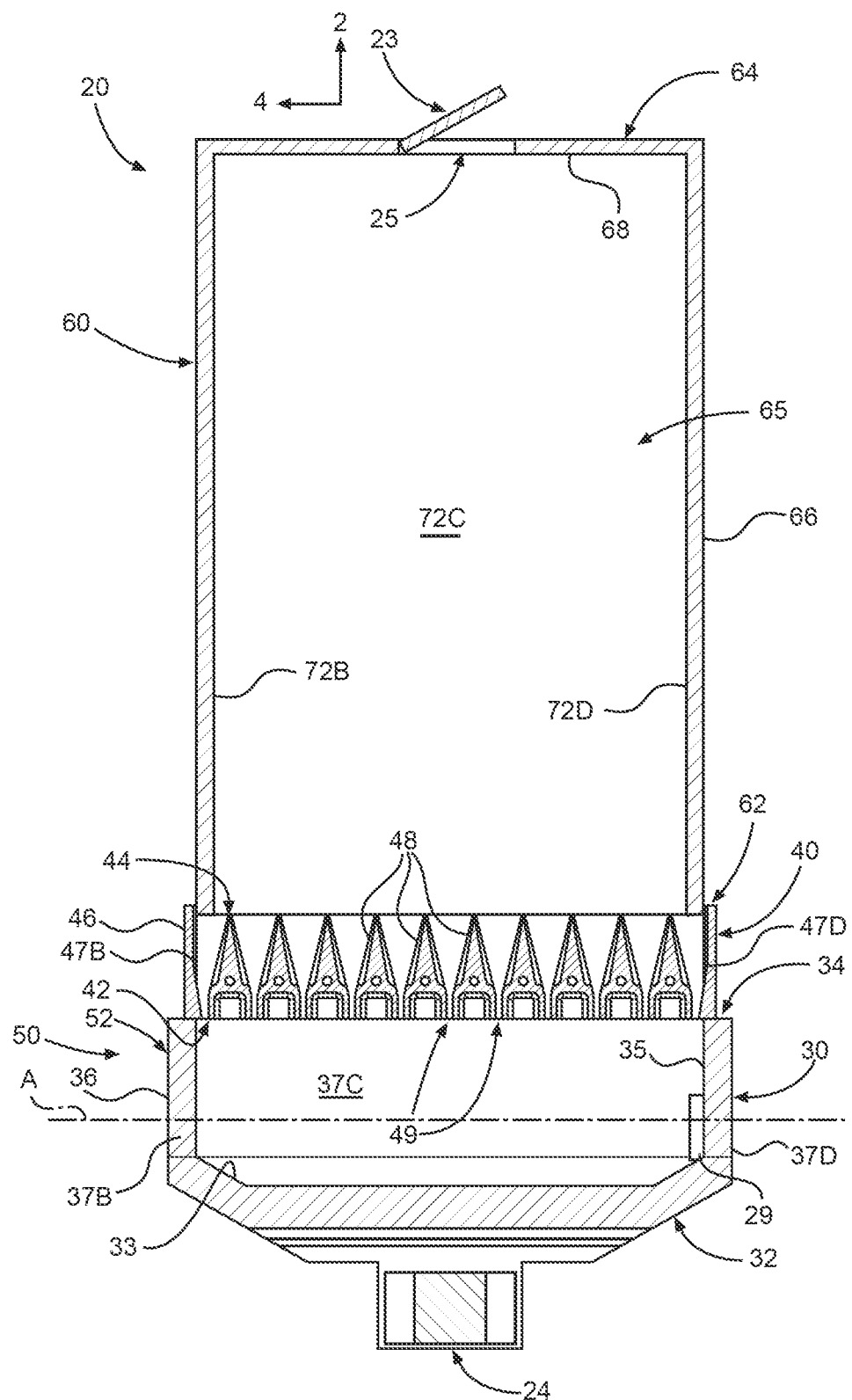
FIG. 4 is a cross-sectional view of the melt unit shown in FIG. 1 with components of the melting system removed for clarity.
Figure 5:
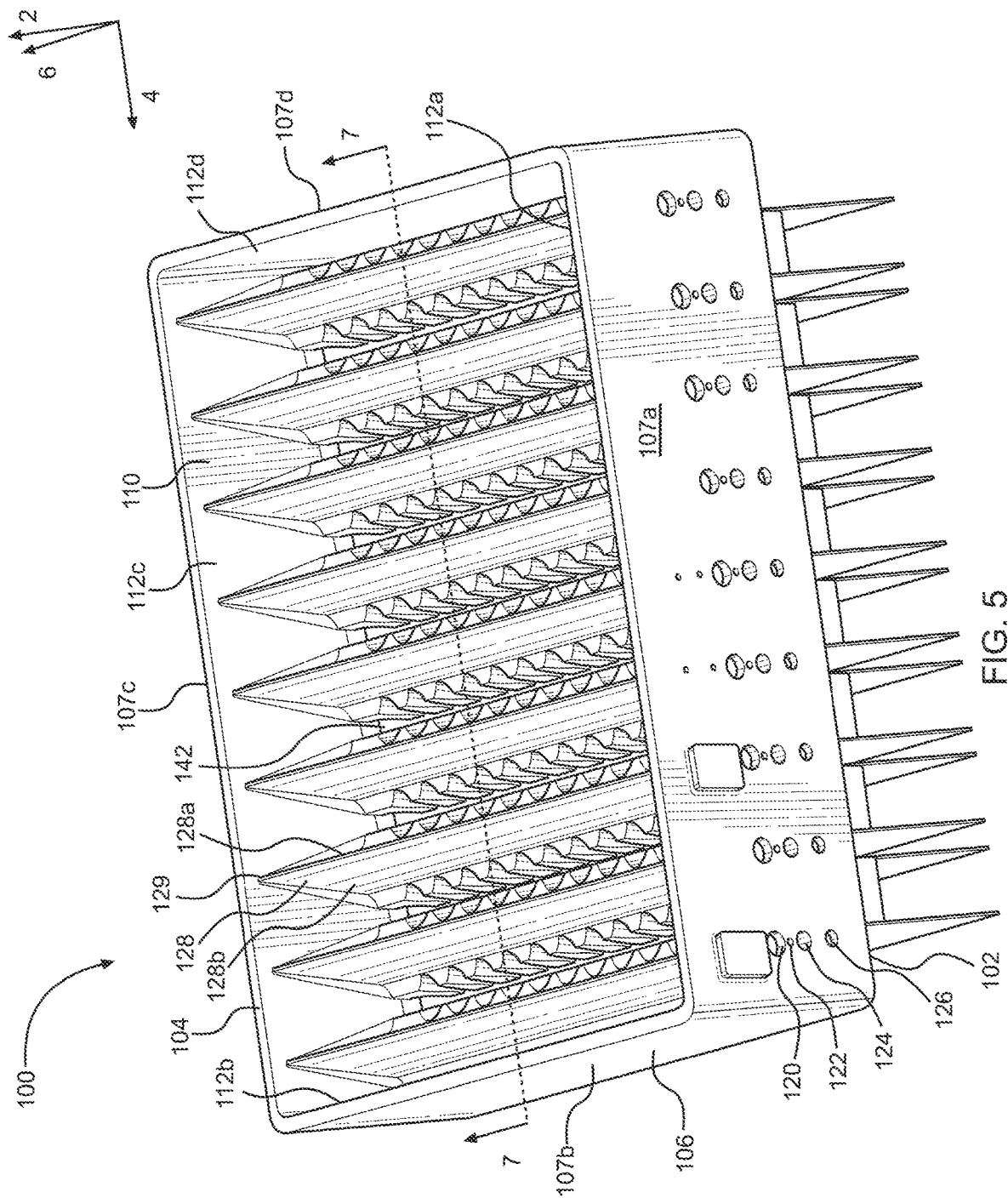
FIG. 5 is a top perspective view of a melt grid and guide members according to an embodiment of the present disclosure.
Figure 6:
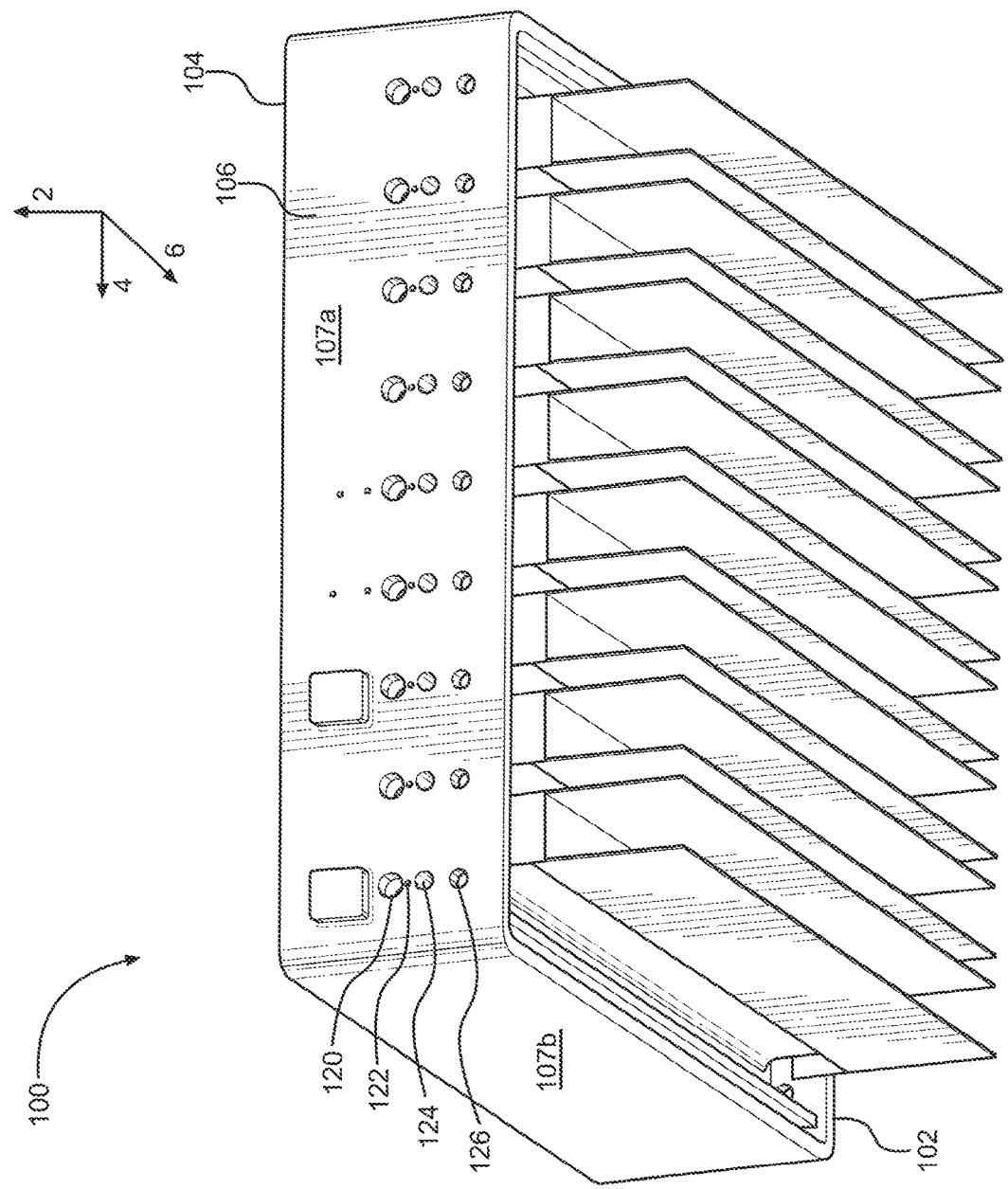
FIG. 6 is a bottom perspective view of the melt grid and guide members shown in FIG. 5.

Turning to FIGS. 3 and 4, the reservoir 30 captures the molten material M exiting the melt grid 40. The reservoir 30 includes a base 32, a top 34 opposite the base 32 along a vertical direction 2, and an outer wall 36. The outer wall 36 includes four sides: first side 37a (not shown), second side 37b, third side 37c and fourth side 37d. The outer wall 36 defines an inner surface 35 along which the sensor 29 is positioned. The base 32 has an inner surface 33, a portion of which can be angled with respect to the vertical direction 2. The inner surface 33 guides molten material M into a portal (not numbered) that feeds into the pump assembly 24 below the reservoir 30. The amount of molten material M that accumulates in the reservoir 30 is based, in part, on a) the throughput of solid material P through the melt grid 40, b) the output of molten material M from the reservoir 30, and c) the height of the outer wall 36.

In accordance with the illustrated embodiment, the thermal isolation region 50 is disposed below the melt grid 40. As shown in FIGS. 3 and 4, the outer wall 36 has a height that is sufficient to facilitate formation of an air gap G between the melt grid 40 and a pool of molten material M that accumulates at the base 32 of the reservoir 30 during operation. As shown, the thermal isolation region 50 comprises, at least in part, the air gap G aligned with an upper portion 52 of the reservoir 30. In this regard, it can be said the thermal isolation region 50 includes the upper portion 52 of the reservoir 30. The upper portion 52 of the outer wall 36 extends from the top 34 of the reservoir 30 to an axis A that extends through the outer wall 36 of the reservoir 30. The axis A is shown at a location above the base 32 of the reservoir 30. The extent of the gap G is selected to separate the bottom of the melt grid 40 from the heated, molten material M in the reservoir 30. The separation creates a thermal barrier that can inhibit or minimize heat transfer from the molten material M to the melt grid 40.

Continuing with FIGS. 3 and 4, the melt grid 40 heats the solid material P in the hopper 60 into the molten material M. The melt grid 40 includes a bottom 42 and a top 44 spaced from the bottom 42 along the vertical direction 2. The bottom 42 of the melt grid 40 is mounted to the top 34 of the reservoir 30. The hopper 60 is coupled to the top 44 of the melt grid 40. The melt grid 40 has an outer wall 46 that includes four sides 47a, 47b, 47c and 47d (only 47b and 47d are shown FIG. 4). The melt grid 40 may also include a plurality of parallel and spaced apart melting rails 48. The melting rails 48 extend across the melt grid 40 along the longitudinal direction 6 (into the sheet in FIG. 3). The melting rails 48 define passages 49 that extend between adjacent melting rails 48. The melting rails 48 can have different orientations as needed. In some instances, cross-bars (not shown) may connect adjacent melting rails. Each melting rail 48 includes one or more heater elements that elevate the temperature of the melting rails 48 to the desired temperature for processing the solid material P. The heating elements are connected to the controller 702 via the wired connector 16. In addition, the melt grid 40 may include guide members 43 coupled to the bottom the melt grid 40. The guide members 43 guide the molten material M as it exits from between the melting rails 48 into the molten material M. The guide members 43 may reduce formation of air bubbles as the molten material M falls from the bottom 42 of the melt grid 40 into the reservoir 30, as will be described below in further detail.

The melt grid 40 is designed for efficient heating to the desired operating temperature from a cooled state. In one example, the melt grid 40 has a mass selected to provide a watt density of 8-10 w/in$^3$. Such a melt grid may take about 20 minutes to reach its desired operating temperature. In another example, the melt grid 40 has a mass selected to increase watt density and utilizes thin film heaters. In this example, the melt grid 40 has a watt density of 60-70 w/in$^3$. Such a melt grid 40 will take about 3-6 minutes to reach its desired operating temperature. In contrast, conventional melt grids use heavy castings and cartridge heaters and have a watt density of 4-5 w/in$^3$. As a result, conventional melt grids will take thirty or more minutes to reach the desired operating temperature. Accordingly, the melt grids as described herein may be considered low mass melt grids and have a watt density that is greater than 6-8 w/in$^3$ and could be as high as 60-70 w/in$^3$. Such low mass melt grids heat up and cool down faster compared to the conventional melt grids. Faster heat-up and cooling increases operational efficiency by reducing the amount of time the melt unit is not generating molten material but is waiting for the system to reach its desired operational temperatures.

Referring to FIGS. 3-4, the hopper 60 is configured to hold solid material P. As illustrated, the hopper 60 has a lower end 62 and an upper end 64 opposite the lower end 62 along the vertical direction 2. The hopper 60 also includes a wall 66 that extends from the lower end 62 to the upper end 64. The upper end 64 includes an upper cover 68 that closes the upper end 64 of the hopper 60. The upper cover 68 can include an access door 23 that may be removable from the upper cover 68, or connected but movable relative to the upper cover 68, such as by a hinge (not shown). The access door 23 covers an opening 25 that extends through the upper cover 68, through which an operator of the melting system 10 can replenish the supply of polymer material P within the hopper 60. The wall 66 of the hopper 60 extends around an entirety of the hopper 60 such that the wall 66 and the upper cover 68 define an internal chamber 65 that holds the solid material P. The lower end 62 of the hopper 60 is substantially open to the melt grid 40. As shown in FIGS. 3-4, the lower end 62 is open to the melting rails 48 and passages 49 of the melt grid 40.

In accordance with the illustrated embodiment, the wall 66 includes a plurality of sides 72a-72d. As best shown in FIGS. 2 and 4, the wall 66 includes a first side 72a, a second side 72b that intersects the first side 72a, a third side 72c that intersects the second side 72b and is opposite the first side 72a, and a fourth side 72d that intersects the first side 72a (FIG. 2) and the third side 72c. The fourth side 72d is opposite the second side 72b. The first side 72a can be considered the front side or front of the hopper 60 and the third side 72c can be considered the back or backside of the hopper 60. A "side" of the hopper 60 can also be referred to as a side wall in certain embodiments. As shown, the upper cover 68 intersects all four sides 72a-72d. The four sides 72a-72d are arranged to form a rectilinear cross-sectional shaped hopper. Although a rectilinear cross-sectional shaped hopper 60 is illustrated, the hopper 60 can have other cross-sectional shapes. For example, in accordance with an alternative embodiment, the hopper 60 has a tubular shape. In such an embodiment, the hopper 60 includes a wall 66 that forms a tubular shaped body. In such an embodiment, the hopper 60 includes a single curved wall.

The hopper 60 has been described and shown as disposed on top of the melt grid 40 that is separated from the molten material in the reservoir 30 by the thermal isolation region 50 (or the air gap G). The thermal isolation region 50 inhibits heat transfer from the molten material M to the solid material P stored in the hopper 60. However, the hopper 60 as described herein can be used in melting systems with different types of melt grids and reservoir configurations than what is shown and described above. Rather, the hopper 60 can be used in any type of melting system where molten material M and the solid material P stored in the hopper 60 are thermally isolated with respect to each other. In other words, embodiments of the present disclosure include a melting system that includes a hopper that is thermally isolated from the reservoir 30 that contains molten material M.

Referring to FIG. 3, in operation, the hopper 60 holds a supply of solid material P on top of the melt grid 40. The melt grid 40 has heating elements that expose the solid material P positioned above the melt grid 40 to a temperature sufficient to form a molten material M. The molten material M flows through the melt grid 40 and is deposited into the reservoir 30, and flows through one or more passageways to the pump assembly 24. The control system 700 implements a closed-loop control mechanism to maintain an adequate level of molten material M in the reservoir 30. The controller 702 receives a signal from the melt grid 40 with data concerning the melt grid temperature. As polymer flows into the reservoir 30, the sensor 29 determines the level of molten material M in the reservoir 30. The sensor 29 transmits a signal to the controller 702. The controller 702 determines if the level of molten material M is at or higher than a threshold level. If the level of molten material M is at or higher than the threshold level, the controller 702 causes the temperature of the melt grid 40 to decrease by a determined amount. The lower melt grid temperature decreases the rate of molten material M flowing into the reservoir 30. This results in the level of molten material M in the reservoir 30 decreasing as molten material M is pumped to the applicator (not shown). The sensor 29 detects when the level of molten material M falls below the threshold level and transmits the signal to the controller 702. The controller 702 causes the temperature of the melt grid 40 to increase, thereby increasing the amount of molten material M flowing into the reservoir 30. The feedback loop between sensor data and temperature adjustment based on the sensor data controls the level of molten material M in the reservoir 30 to maintain an air gap G below the melt grid 40. During the control process described above, the pump assembly 24, however, is used to continuously pump the molten material M from the reservoir 30 through hoses (not shown) to an applicator (not shown), which ejects the molten material M onto the desired substrate. As molten material M is ejected, the supply of solid material P in the hopper 60 is depleted.

Referring to FIGS. 5-8, one embodiment of a melt grid 100 and other components that can be used in the melting system 10 will be discussed. Melt grid 100, like melt grid 40, is configured to turn the solid material P in the hopper 60 into a molten material M. Melt grid 100 defines a bottom 102, a top 104 opposite the bottom 102 along the vertical direction 2, and an outer wall 106 that extends between the top 104 and the bottom 102. The bottom 102 of the melt grid 100 is mounted to the top 34 of the reservoir 30, while the top 104 of the melt grid 100 is coupled to the hopper 60. The melt grid 100 may define a substantially rectangular shape, and thus the outer wall 106 can define four outer sides 107a-107d, specifically, the outer wall 106 can include a first outer side 107a, a second outer side 107b, a third outer side 107c that is opposite the first outer side 107a along the longitudinal direction 6, and a fourth outer side 107d that is opposite the second outer side 107b along the lateral direction 4. The second and fourth outer sides 107b and 107d extend from the first to the third outer sides 107a and 107c. The melt grid 100 also defines an inner wall 110 opposite the outer wall 106, where the inner wall includes four inner sides 112a-112d. Specifically, the inner wall 110 includes a first inner side 112a, a second inner side 112b, a third inner side 112c opposite the first inner side 112a along the longitudinal direction 6, and a fourth inner side 112d opposite the second inner side 112b along the lateral direction 4. The second and fourth inner sides 112b and 112d can extend from the first inner side 112a to the third inner side 112c. The inner wall 110, in particular the first and third inner sides 112a and 112c, can attach to and support one or more guide members, such as guide member 154, as will be discussed further below.

Like the melt grid 40, the melt grid 100 includes a plurality of melting rails 128. Though nine melting rails 128 are depicted, the melt grid 100 can include more or less melting rails as desired based upon the particular designs of various melting systems 10 and the requirements of different melting operations. As depicted, each of the melting rails 128 extends from the first inner side 112a to the third inner side 112c along the longitudinal direction 6, with each of the melting rails 128 being spaced apart along the lateral direction 4. However, it is also contemplated that the melting rails 128 can extend from the second inner side 112b to the fourth inner side 112d along the lateral direction 4, with each of the melting rails 128 being spaced apart along the longitudinal direction 6. In either embodiment, the melting rails 128 can extend substantially parallel to each other. Additionally, each of the melting rails 128 can extend from the bottom 102 of the melt grid 100 toward the top 104 along the vertical direction 2.

The melt grid 100 further defines at least one passage that extends through the outer wall 106, the inner wall 110, and the melting rails 128. In the depicted embodiment, the melt grid 100 defines at least four passages: a first passage 120, a second passage 122, a third passage 124, and a fourth passage 126. The first through fourth passages 120, 122, 124, and 126 can each be configured to allow a heating element, a heating liquid, or a cooling liquid to pass through the melting rails 128 to increase temperature control over the melt grid 100, and likewise the solid material P and the molten material M. Specifically, heating elements can be used to elevate the temperature for processing the solid material P. The heating elements are connected to the controller 702 via the wire connector 16. As shown, the first through fourth passages 120, 122, 124, and 126 extend from the first outer side 107a to the third outer side 107c through each of the melting rails 128. However, in embodiments where the melting rails 128 extend from the second inner side 112b to the fourth inner side 112d, the first through fourth passages 120, 122, 124, and 126 will extend from the second outer side 107b to the fourth outer side 107d. Though the second passage 122 is depicted as defining a smaller cross section than the first, third, and fourth passages 120, 124, and 126, each can be differently sized based upon the particular heating or cooling liquid or element that will pass through, as well as the relative dimensions of the other passages. Also, though the melt grid 100 is shown as including four passages 120, 122, 124, and 126, the melt grid 100 can include more or less passages as desired.

Continuing with FIGS. 7-8, the structure of the melting rails 128 will be further described with reference to a single exemplary melting rail 128. The melting rail 128 defines a top corner 129 that defines the uppermost portion of the melting rail 128 along the vertical direction 2. The melting rail 128 further defines a first surface 128a and a second surface 128b opposite the first surface 128a along the lateral direction 4, where the first and second surfaces 128a and 128b meet at the top corner 129 and extend away from the top corner 129 along the vertical and lateral directions 2 and 4. The first and second surfaces 128a and 128b are configured to contact and transfer heat to the solid material P to transition the solid material P into the molten material M. The first and second surfaces 128a and 128b can define an angle θ at the top corner 129 of the melting rail 128, such that the first and second surfaces 128a and 128b are angularly offset by the angle θ. The angle θ as depicted is about 30 degrees. As a result, the melting rail 128 defines a substantially triangular cross-section when viewed along a plane defined by the vertical and lateral directions 2 and 4. However, the angle θ can be more or less than 30 degrees as desired. For example, the angle θ can be from about 10 degrees to about 50 degrees.

Opposite the top corner 129, the melting rail 128 can define a rail bottom recess 138 that extends upward into the melting rail 128 along the vertical direction 2. The rail bottom recess 138 allows for the conservation of material when constructing the melt grid 100 by preventing the melting rail 128 from being completely solid, as well as allowing for increased efficiency in heating the melting rail 128, as less material in the melting rail 128 needs to be heated during the course of operating the melting system 10. The melting rail 128 can define a first inner rail surface 134a, a second inner rail surface 134b, and a third inner rail surface 134c that partially define the rail bottom recess 138. The first and second inner rail surfaces 134a and 134b can extend from the first inner side 112a to the third inner side 112c of the melt grid 100 along the longitudinal direction 6, such that the first inner rail surface 134a is spaced from the second inner rail surface 134b along the lateral direction 4. The third inner rail surface 134c can extend from the first inner rail surface 134a to the second inner rail surface 134b along the lateral direction, as well as from the first inner side 112a to the third inner side 112c of the melt grid 100 along the longitudinal direction 6. As a result, the third inner rail surface 134c may be oriented substantially transverse to the first and second inner rail surfaces 134a and 134b.

Figure 7:
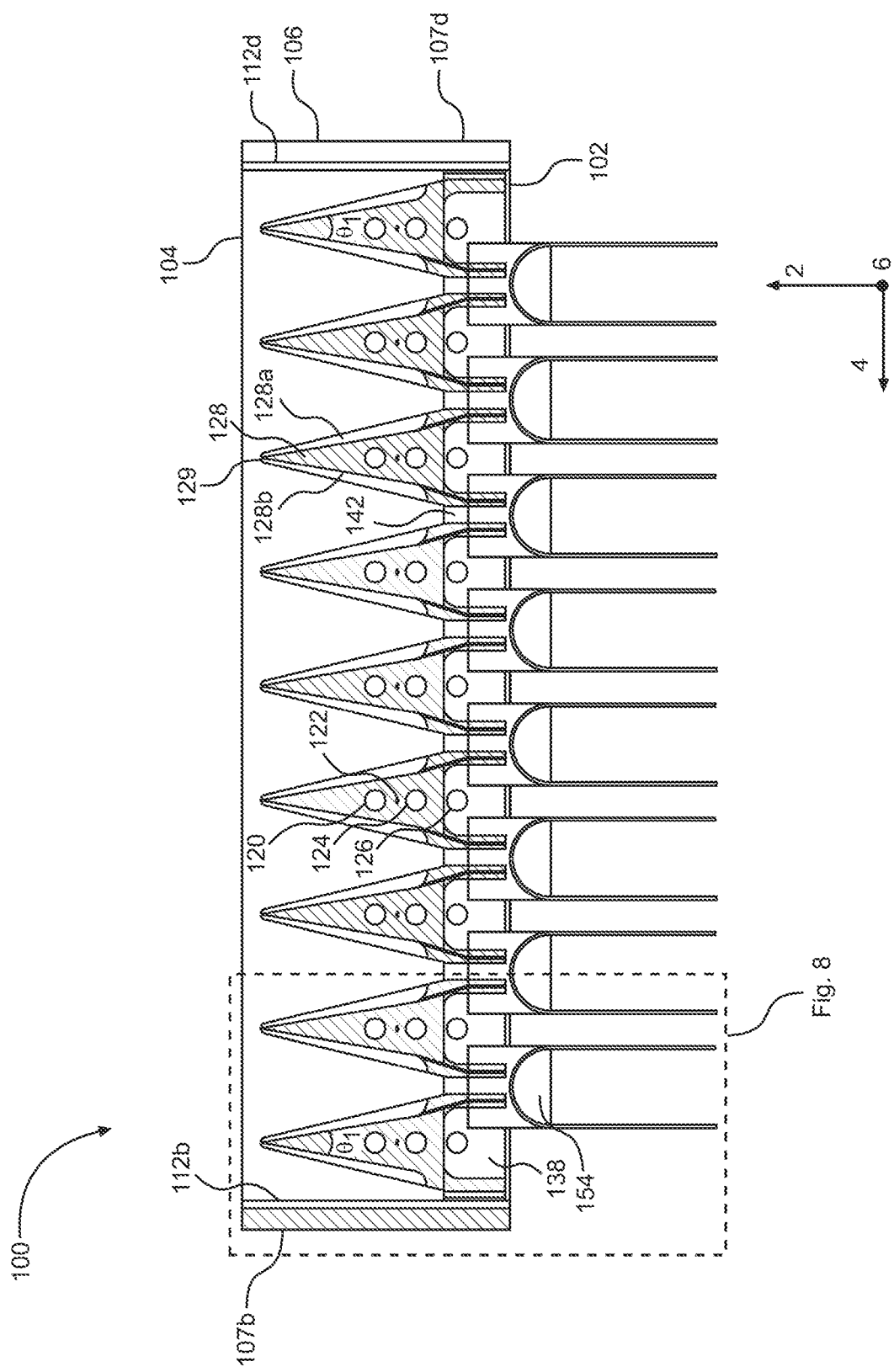
FIG. 7 is a cross-sectional view of the melt grid and guide members shown in FIG. 5 taken along the line 7-7.
Figure 8:
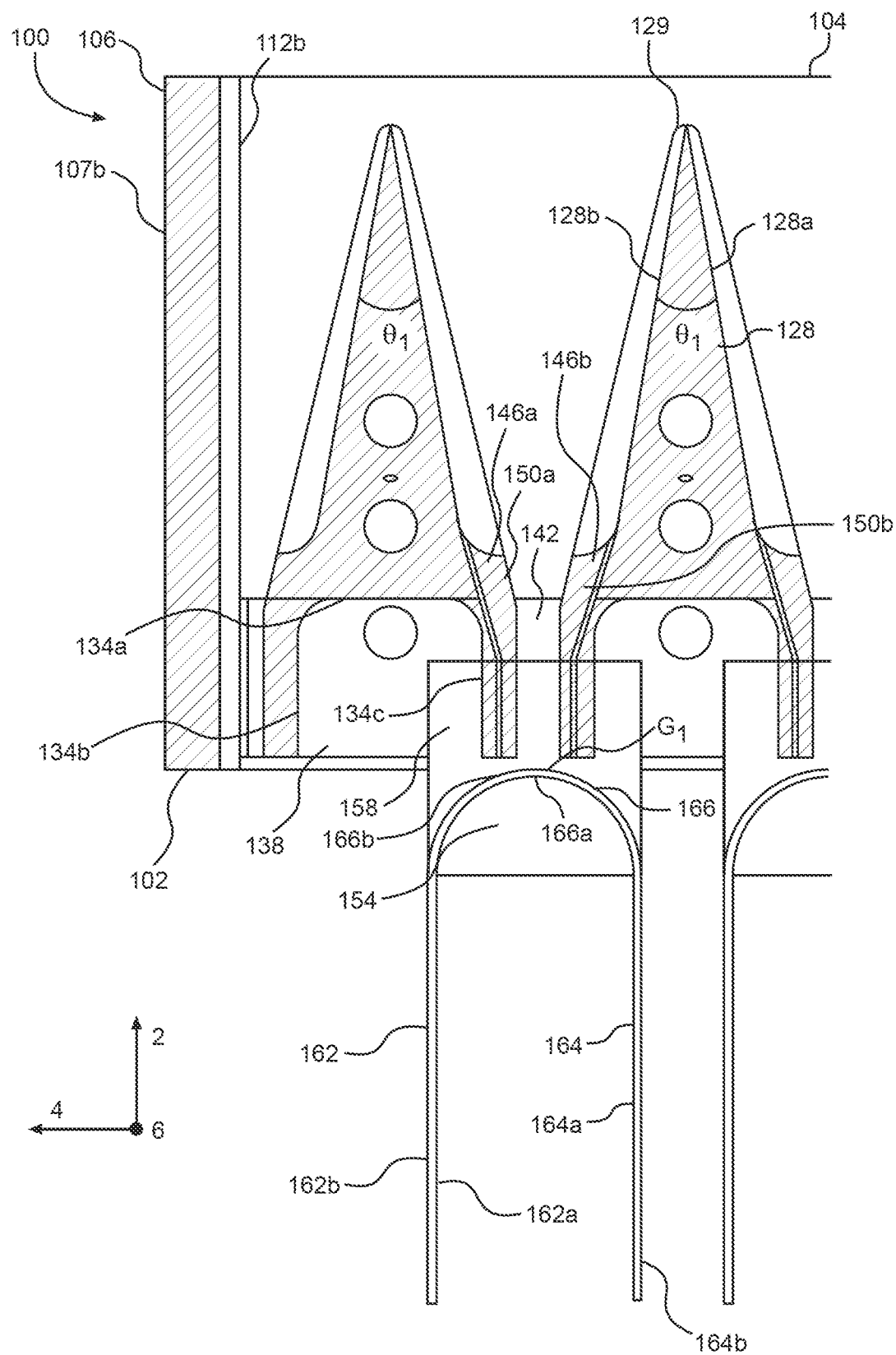
FIG. 8 is a cross-sectional view of the encircled region of the melt grid and guide members shown in FIG. 7.
Figure 9A:
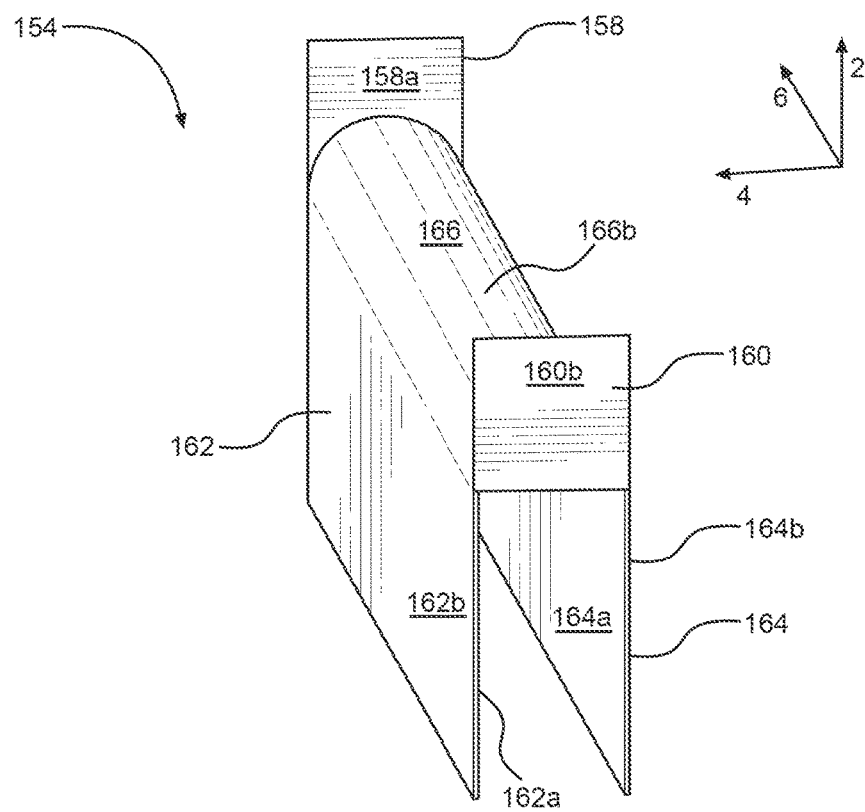
FIG. 9A is a perspective view of a guide member shown in FIG. 5.
Figure 9B:
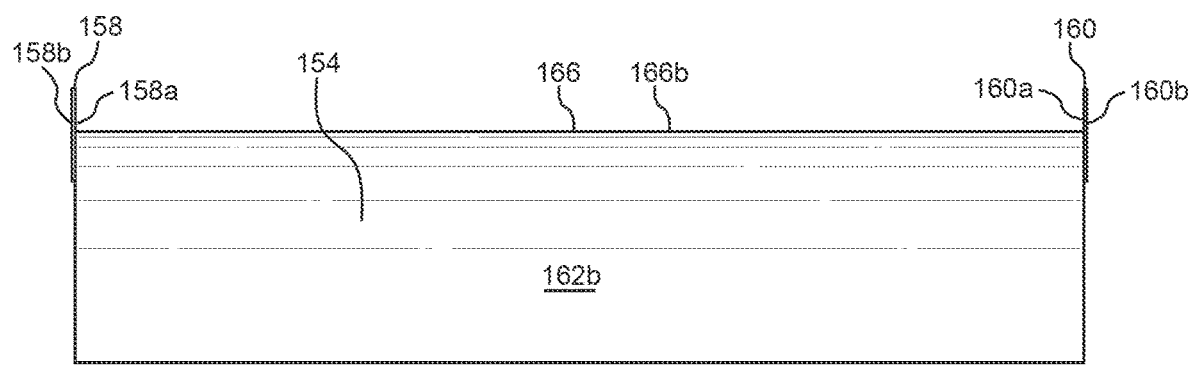
FIG. 9B is a side view of the guide member shown in FIG. 9A.

Continuing with FIGS. 7-8, the melting rails 128 are spaced apart from each other as well as from the second and fourth inner sides 112b and 112d along the lateral direction 4, such that flow passages 142 are defined between the adjacent melting rails 128, as well as between a melting rail 128 and the second inner side 112b, and between another melting rail 128 and the fourth inner side 112d. The flow passages 142 provide a pathway for adhesive to flow through the melt grid 100 along the vertical direction 2. As a result, the flow passages 142 allow any solid material P from the hopper 60 that has been heated sufficiently and transitioned into the molten material M to flow from above the melt grid 100 to the reservoir 30.

Additionally, each of the melting rails 128 can define a first support pad 146a and a second support pad 146b opposite the first support pad 146a along the lateral direction 4. The first support pad 146a can extend from the first surface 128a of a melting rail 128 along the lateral direction 4, while the second support pad 146b can extend from the second surface 128b of the melting rail 128 along the lateral direction 4. The first support pad 146a can define a flow passage 150a that extends through the support pad 146a, while the second support pad 146b can define a flow passage 150b that extends through the support pad 146b. Each of the flow passages 150a and 150b can be open to a flow passage 142. Though only one first support pad 146a and one support pad 146b is shown in the cross-sections of the melt grid 100 depicted in FIGS. 7-8, each of the melting rails 128 can define a plurality of support pads 146a and flow passages 150a spaced apart along longitudinal direction 6, as well as a plurality of support pads 146b and flow passages 150b spaced apart along the longitudinal direction 6. As shown, the support pads 146a of one melting rail 128 may face the support pads 146b of an adjacent melting rail 128. The support pads 146a and 146b and the corresponding flow passages 150a and 150b can help provide an increased surface area for supporting the un-molten and semi-molten material as it flows from above the melt grid 100 toward the reservoir 30, which can help increase the flow rate of molten material M through the melt grid 100 and prevent the backup of molten material M above the melt grid 100.

The melting system 10 can further include at least one guide member attached to the melt grid 100 to prevent air bubbles from becoming entrapped in the melted material M as it flows from the melt grid 100 to the reservoir 30, as will be discussed further below. As shown in FIGS. 5-9B, one embodiment of such a guide member is guide member 154. Though the melting system 10 can include a plurality of guide members 154, only one guide member 154 will be discussed below for brevity. The guide member 154 defines a first wall 158 and a second wall 160 opposite the first wall 158. The first wall 158 defines an inner surface 158a and an outer surface 158b opposite the inner surface 158a, while the second wall 160 defines an inner surface 160a and an outer surface 160b opposite the inner surface 160a, such that the inner surface 158a of the first wall 158 faces the inner surface 160a of the second wall 160. To attach the guide member 154 to the melt grid 100, the outer surfaces 158b and 160b of the first and second walls 158 and 160 can engage the inner wall 110 of the melt grid 100. Specifically, in the embodiments shown, the first wall 158 of the guide member 154 engages the third inner side 112c of the inner wall 110, and the second wall 160 of the guide member 154 engages the first inner side 112a of the inner wall 110. As a result, each of the guide members 154 will be spaced apart along the lateral direction 4. However, in other embodiments where the melting rails 128 are differently oriented, it is contemplated that the guide member 154 can attach to different portions of the inner wall 110 as desired. The guide member 154 may be attached to the melt grid 100 through a variety of means, such as through fasteners, welding, adhesive, integral molding, etc. As a result, the guide member 154 may be releasably attachable to the melt grid 100, or may be permanently attached to the melt grid 100.

The guide member 154 also includes a curved guide wall 166 that extends from the first wall 158 to the second wall 160. In the depicted embodiment, the curved guide wall 166 defines a semi-circular shape, though other shapes are also contemplated. The curved guide wall 166 defines an inner wall 166a and an outer wall 166b that is opposite the inner wall 166a. Additionally, the guide member 154 can include a first guide wall 162 and a second guide wall 164 that each extend form the curved guide wall 166 along the vertical direction 2. In the depicted embodiment, the first and second guide walls 162 and 164 are spaced apart along the lateral direction 4, while the first and second walls 158 and 160 are spaced apart along the longitudinal direction 6. The first guide wall 162 defines an inner wall 162a and an outer wall 162b opposite the inner wall 162a, while the second guide wall 164 defines an inner wall 164a and an outer wall 164b opposite the inner wall 164a. The inner wall 162a of the first guide wall 162 can substantially face the inner wall 164a of the second guide wall 164. The inner wall 162a of the first guide wall 162, the inner wall 166a of the curved guide wall 166, and the inner wall 164a of the second guide wall 164 can define a continuous surface, while the outer wall 162b of the first guide wall 162, the outer wall 166b of the curved guide wall 166, and the outer wall 164b of the second guide wall 164 can define another continuous surface.

When attached to the melt grid 100, the guide member 154 can be positioned such that the outer curved wall 166b of the curved guide wall 166 is directly under a flow passage 142 defined between two adjacent melting rails 128 along the vertical direction 2. In particular, the apex of the curved guide wall 166 can be aligned with the center of the flow passage 142. As a result, a gap $G_1$ is defined between the lower ends of the two adjacent melting rails 128 and the curved guide wall 166 of the guide member 154. In operation, as the melt grid 100 melts the solid material P into the molten material M, the resulting molten material M flows through the flow passage 142 defined between two adjacent melting rails 128, as well as through the flow passage 150a defined by the first support pad 146a and the second flow passage 150b defined by the second support pad 146b. Without the presence of the guide member 154, molten material M would otherwise flow downward from the flow passage 142 and through the thermal isolation region 50 uninhibited, until the molten material M contacts a pool of molten material M contained by the reservoir 30. With the guide member 154, molten material M contacts the outer wall 166b of the curved guide all 166 after it flows through the flow passage 142, and further flows along the outer wall 162b of the first guide wall 162 and/or the outer wall 164b of the second guide wall 164 and to the pool of molten material M in the reservoir 30.

Figure 10A:
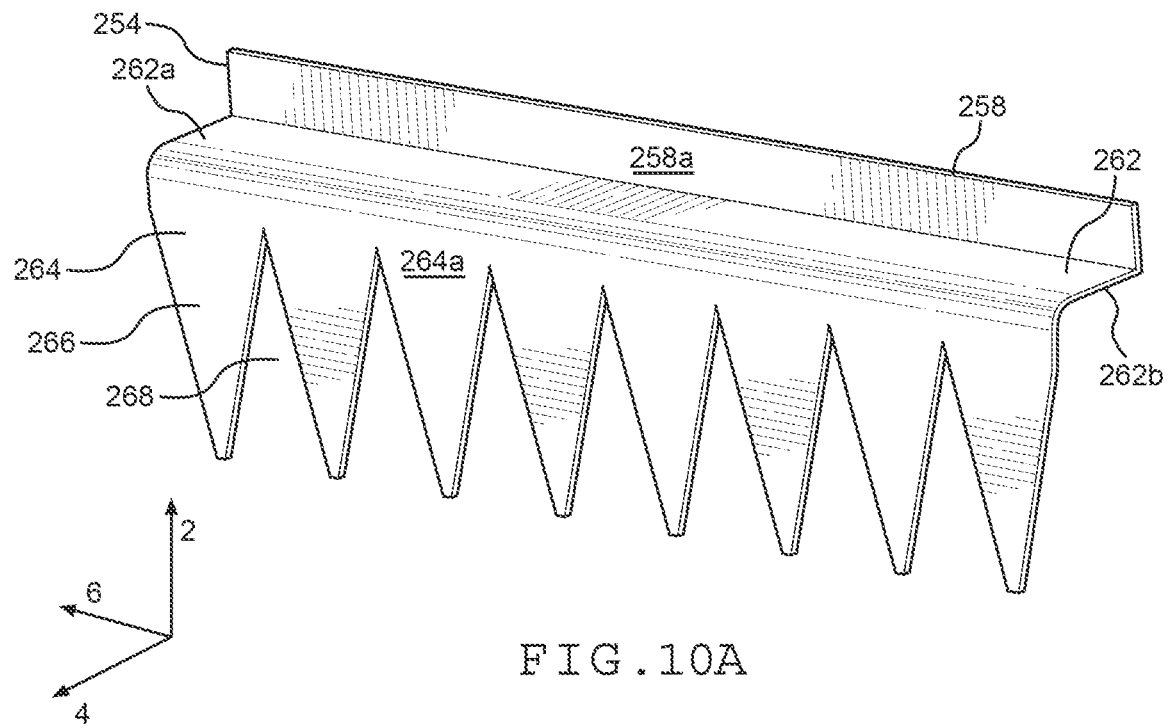
FIG. 10A is a perspective view of a guide member according to an embodiment of the present disclosure.
Figure 10B:
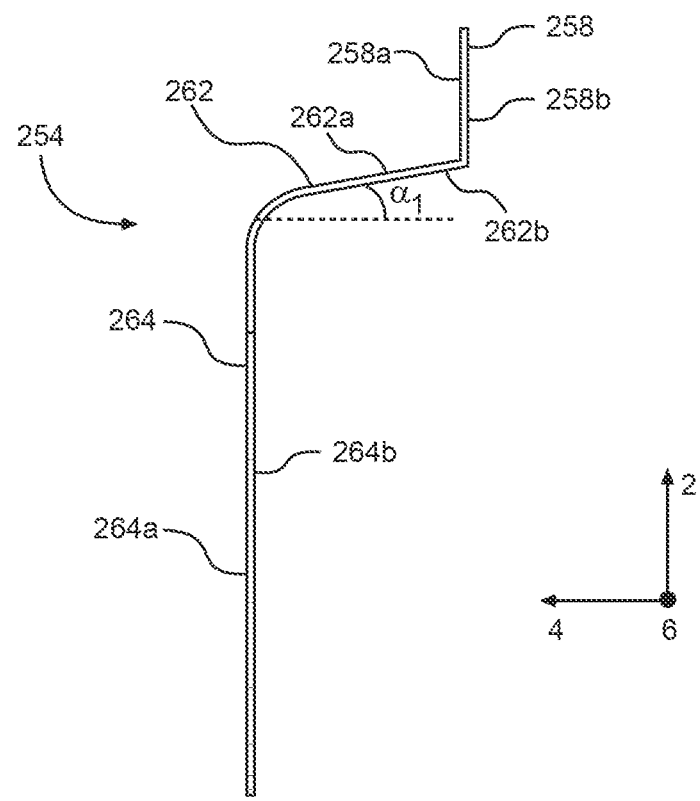
FIG. 10B is a side view of the guide member shown in FIG. 10A.

Continuing with FIGS. 10A-10B, a guide member 254 according to another embodiment of the present disclosure is shown. Though a plurality of guide members 254 can be included in the melting system 10, only one guide member 254 will be discussed for brevity. The guide member 254 includes an attachment wall 258, a lateral wall 262 that extends from the attachment wall 258, and a guide wall 264 that extends from the lateral wall 262. The attachment wall 258 and the guide wall 264 can extend substantially along the vertical direction 2, though other orientations for these walls are contemplated. Also, the attachment wall 258 is spaced from the guide wall 264 along the lateral and vertical directions 2 and 4. The lateral wall 262 is depicted as meeting the guide wall 264 at a substantially curved intersection. However, this intersection can define a sharp angle if desired. The lateral wall 262 can be angularly offset with respect to the lateral direction 4, such that the lateral wall is offset from a plane defined by the lateral and longitudinal directions 4 and 6 by an angle $\alpha_1$. As depicted, the angle is about 25 degrees. However, the angle can be from about 0 degrees to about 90 degrees. The guide wall 264 can define a plurality of tabs 266, which can be spaced apart along the lateral direction 2. In the depicted embodiment, the tabs 266 are substantially triangular in shape. However, the tabs 266 can be alternatively configured, such that the tabs 266 are rectangular, circular, etc. A gap 268 is defined between each adjacent pair of tabs 266, and extends into the guide wall 264 from the end of the guide wall 264.

The attachment wall 258 can include an inner surface 258a and an outer surface 258b opposite the inner surface 258a. The attachment wall 258 can function as the part of the guide member 254 that secures the guide member 254 to a portion of the melt grid 100, such as one of the melting rails 128. In particular, the inner or outer surfaces 258a or 258b of the attachment wall 258 can be secured to the first or second inner rail surface 134a or 134b, though other securing locations are contemplated. As with the guide member 154, the guide member 254 may be attached to the melt grid 100 through a variety of means, such as through fasteners, welding, adhesive, integral molding, etc. As a result, the guide member 254 may be releasably attachable to the melt grid 100, or may be permanently attached to the melt grid 100.

The lateral wall 262 can define a top surface 262a and a bottom surface 262b opposite the top surface 262a, and the guide wall 264 can define an inner surface 264a and an outer surface 264b opposite the inner surface 264a. As a result, the inner surface 258a of the attachment wall 258, the top surface 262a of the lateral wall 262, and the inner surface 264a of the guide wall 264 can define a continuous surface, while the outer surface 258b of the attachment wall 258, the bottom surface 262b of the lateral wall 262, and the outer surface 264b of the guide wall 264 can define another continuous surface. When the guide member 254 (or a plurality of guide members 254) is attached to the melt grid 100, the top surface 262a of the lateral wall 262 is positioned below the flow passage 142 along the vertical direction 2. In operation, molten material M flowing through the flow passages 142 contacts the top surface 262a of the lateral wall 262. From there, the molten material M flows along the top surface 262a, along the inner surface 264a of the guide wall 264, along the tabs 266, and into the reservoir 30.

Figure 11A:
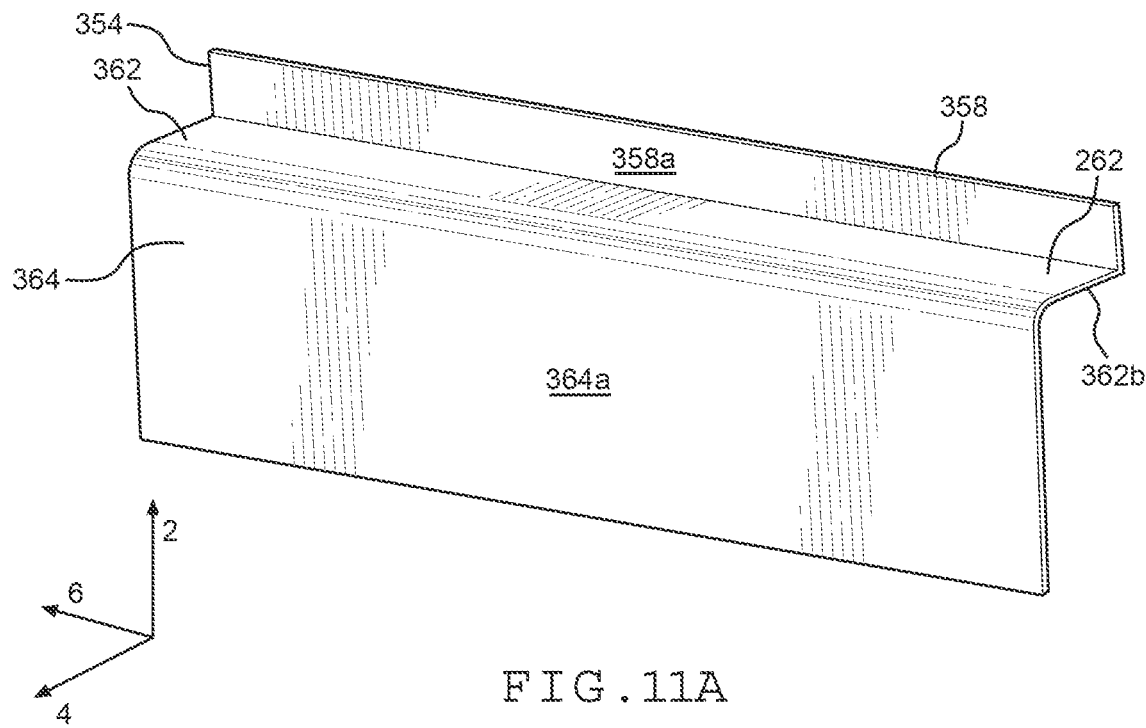
FIG. 11A is a perspective view of a guide member according to an embodiment of the present disclosure.
Figure 11B:
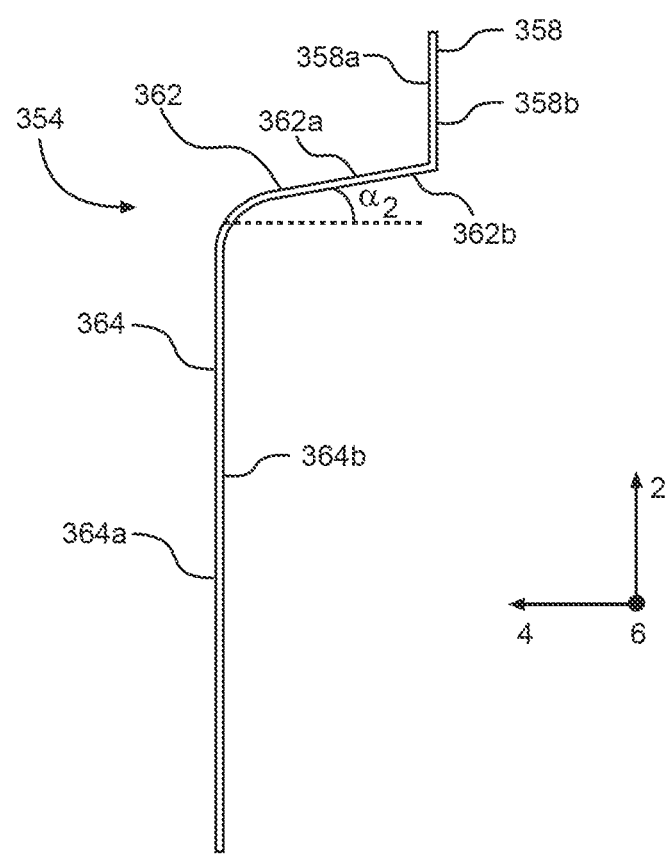
FIG. 11B is a side view of the guide member shown in FIG. 11A.

Continuing with FIGS. 11A-11B, a guide member 354 according to another embodiment of the present disclosure is shown. The guide member 354 is similar to the guide member 254, but with notable differences that will be detailed below. Though a plurality of guide members 354 can be included in the melting system 10, only one guide member 354 will be discussed for brevity. The guide member 354 includes an attachment wall 358, a lateral wall 362 that extends from the attachment wall 358, and a guide wall 364 that extends from the lateral wall 362. The attachment wall 358 and the guide wall 364 can extend substantially along the vertical direction 2, though other orientations for these walls are contemplated. Also, the attachment wall 358 is spaced form the guide wall 364 along the lateral and vertical directions 2 and 4. The lateral wall 362 is depicted as meeting the guide wall 364 at a substantially curved intersection. However, the intersection can define a sharp angle if desired. The lateral wall 362 can be angularly offset with respect to the lateral direction 4, such that the lateral wall 362 is offset from a plane defined by the lateral and longitudinal directions 4 and 6 by an angle $\alpha_2$. As depicted, the angle $\alpha_2$ is about 25 degrees. However, the angle $\alpha_2$ can be from about 0 degrees to about 90 degrees. Unlike the guide wall 264 of the guide member 254, the guide wall 364 defines a substantially solid, rectangular shape devoid of the tabs 266 or gaps 268 included in the guide wall 264.

The attachment wall 358 can include an inner surface 358a and an outer surface 358b opposite the inner surface 358a. The attachment wall 358 can function as the part of the guide member 354 that attaches the guide member 354 to a portion of the melt grid 100, such as one of the melting rails 128. In particular, the inner or outer surfaces 358a or 358b of the attachment wall 358 can be secured to the first or second inner rail surface 134a or 134b, though other securing locations are contemplated. As with the guide member 154, the guide member 354 may be attached to the melt grid 100 through a variety of means, such as through fasteners, welding, adhesive, integral molding, etc. As a result, the guide member 354 may be releasably attachable to the melt grid 100, or may be permanently attached to the melt grid 100.

The lateral wall 362 can define a top surface 362a and a bottom surface 362b opposite the top surface 362a, and the guide wall 364 can define an inner surface 364a and an outer surface 364b opposite the inner surface 364a. As a result, the inner surface 364a of the attachment wall 358, the top surface 362a of the lateral wall 362, and the inner surface 364a of the guide wall 364 can define a continuous surface, while the outer surface 358b of the attachment wall 358, the bottom surface 362b of the lateral wall 362, and the outer surface 364b of the guide wall 364 can define another continuous surface. When the guide member 354 (or a plurality of guide members 354) is attached to the melt grid 100, the top surface 362a of the lateral wall 362 is positioned below the flow passage 142 along the vertical direction 2. In operation, molten material M flowing through the flow passages 142 contacts the top surface 362a of the lateral wall 362. From there, the molten material M flows along the top surface 362a, along the inner surface 364a of the guide wall 364, and into the reservoir 30.

Figure 12:
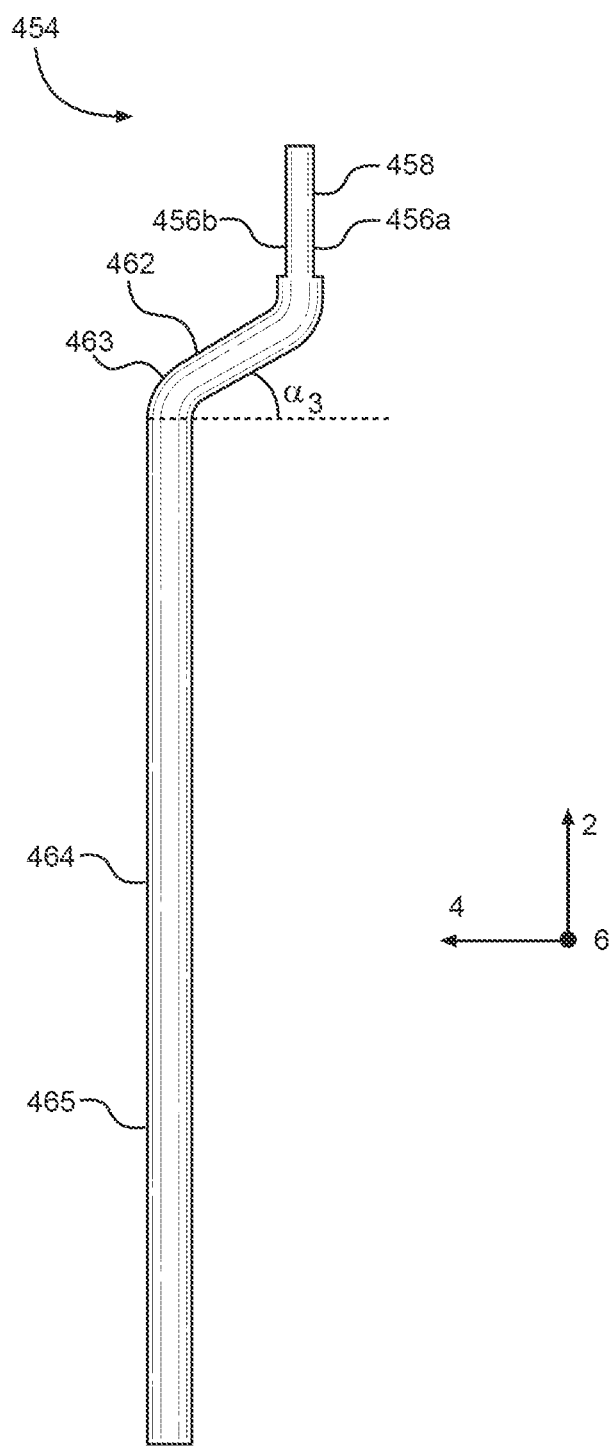
FIG. 12 is a guide member according to an embodiment of the present disclosure.
Figure 13:
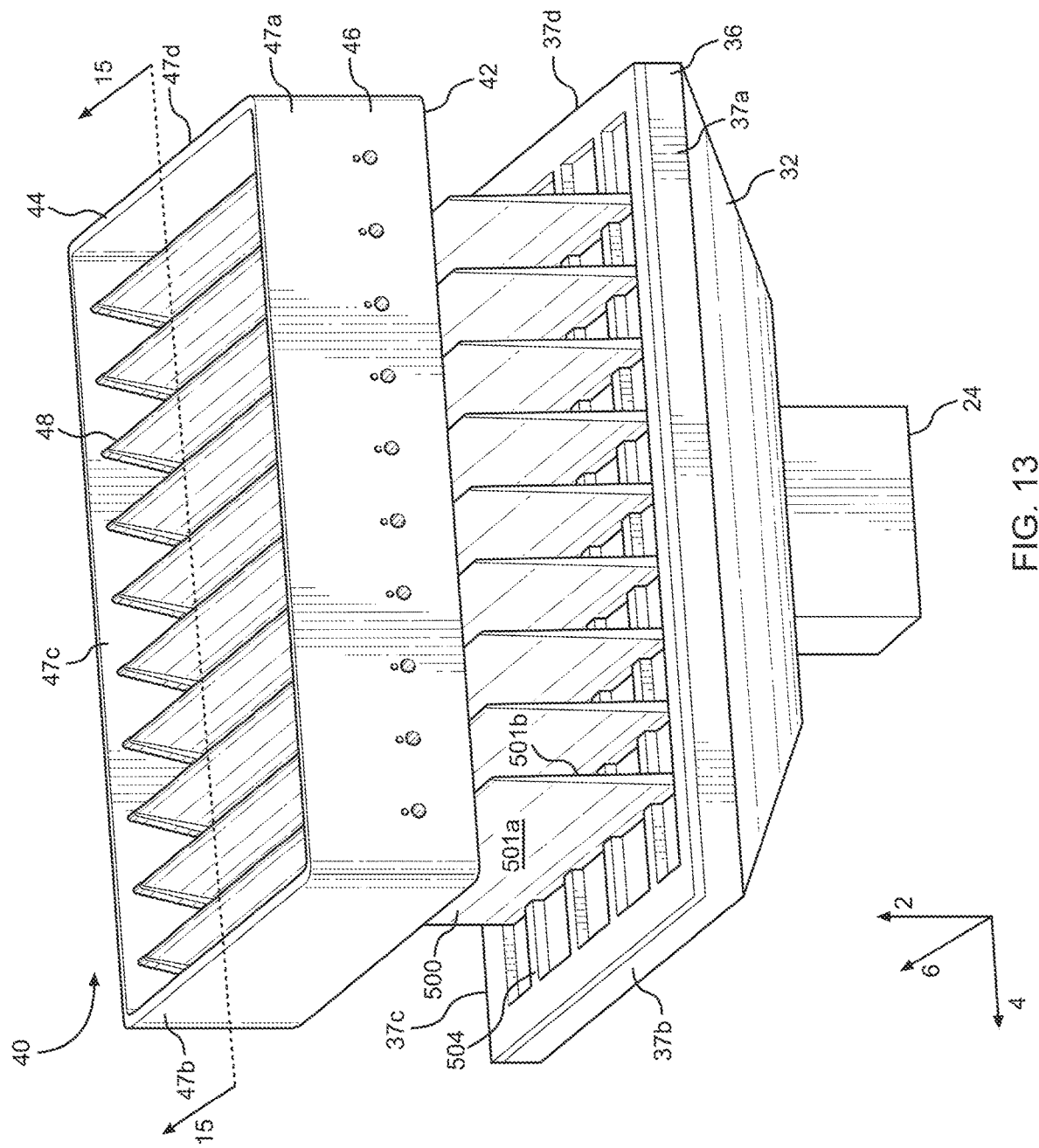
FIG. 13 is a top perspective view of a portion of a melt grid and reservoir according to an embodiment of the present disclosure, with certain elements removed for clarity.
Figure 14:
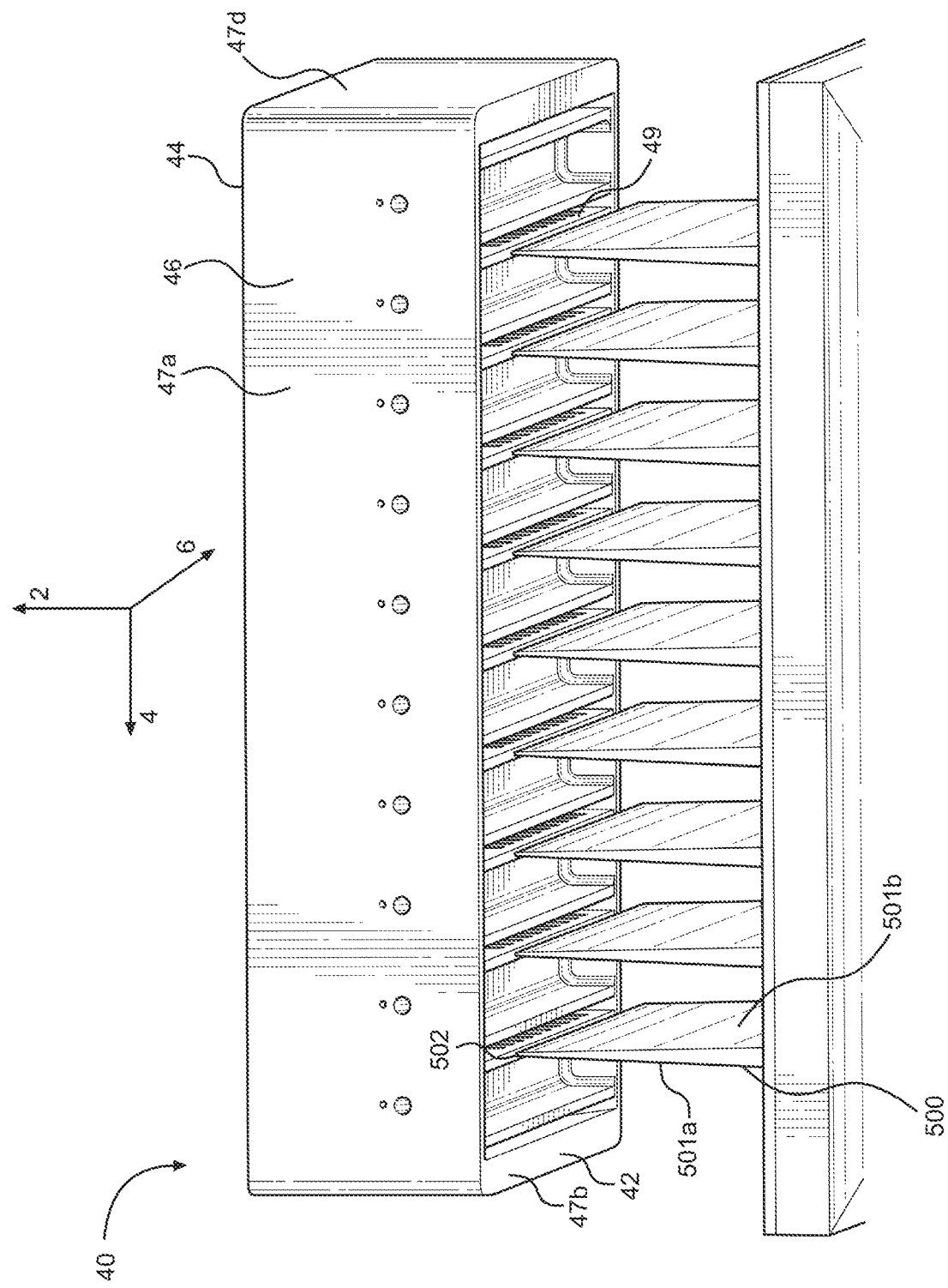
FIG. 14 is a bottom perspective view of the portion of the melt grid and reservoir shown in FIG. 13, with certain elements removed for clarity.
Figure 15:
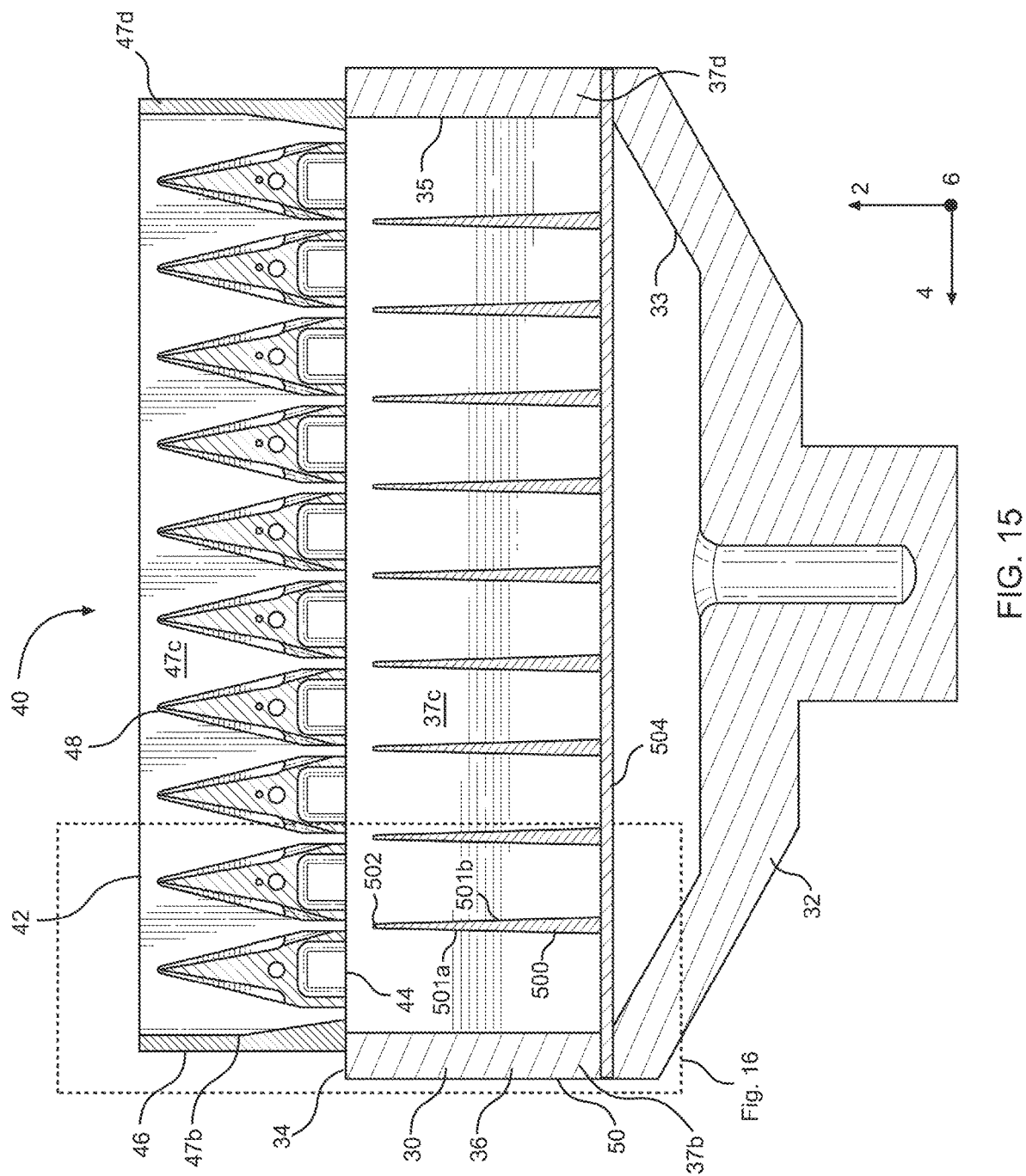
FIG. 15 is a cross-sectional view of the melt grid and reservoir shown in FIG. 13 taken along the line 15-15.
Figure 16:
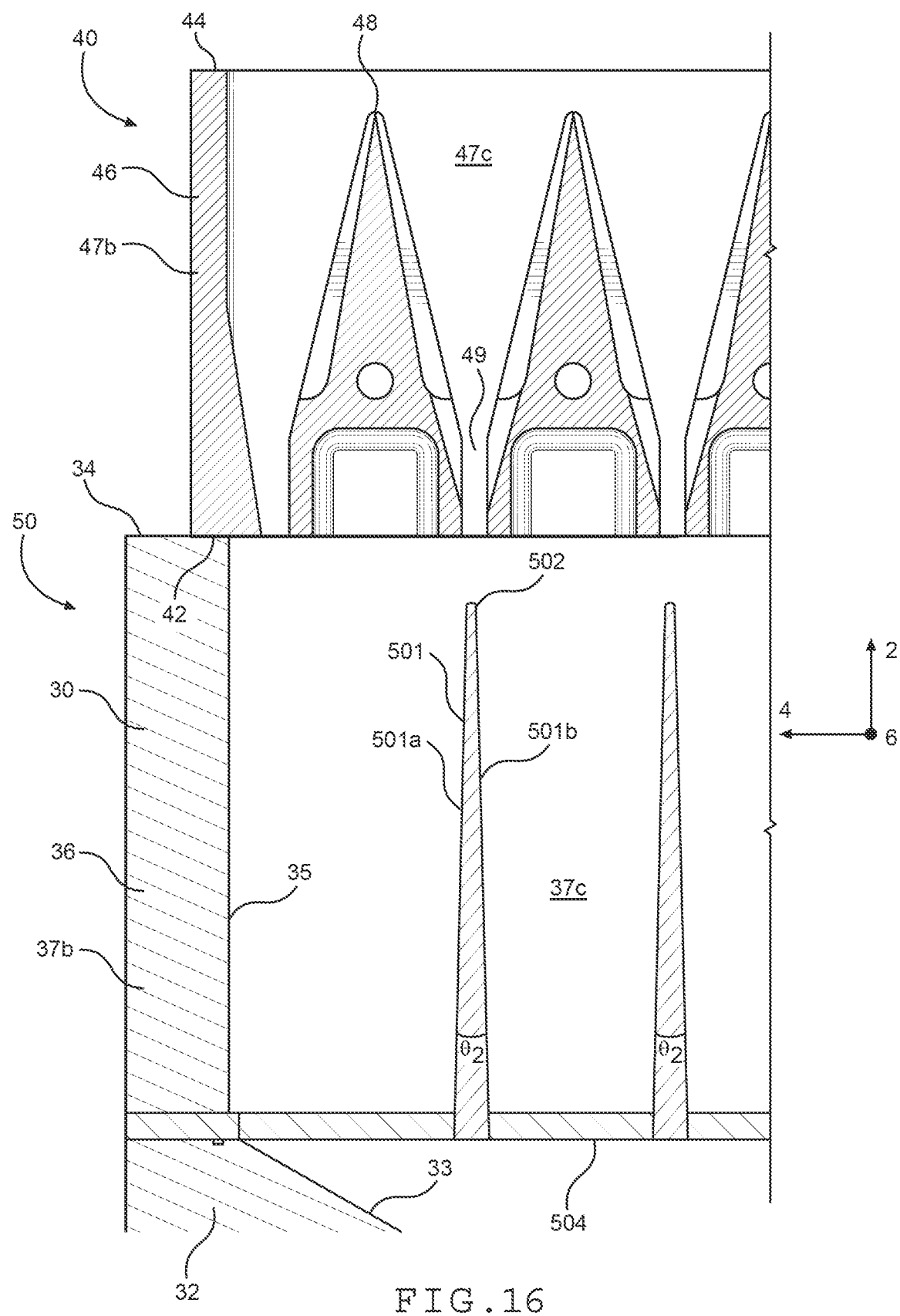
FIG. 16 is a cross-sectional view of the encircled region of the melt grid and reservoir shown in FIG. 15.
Figure 17:
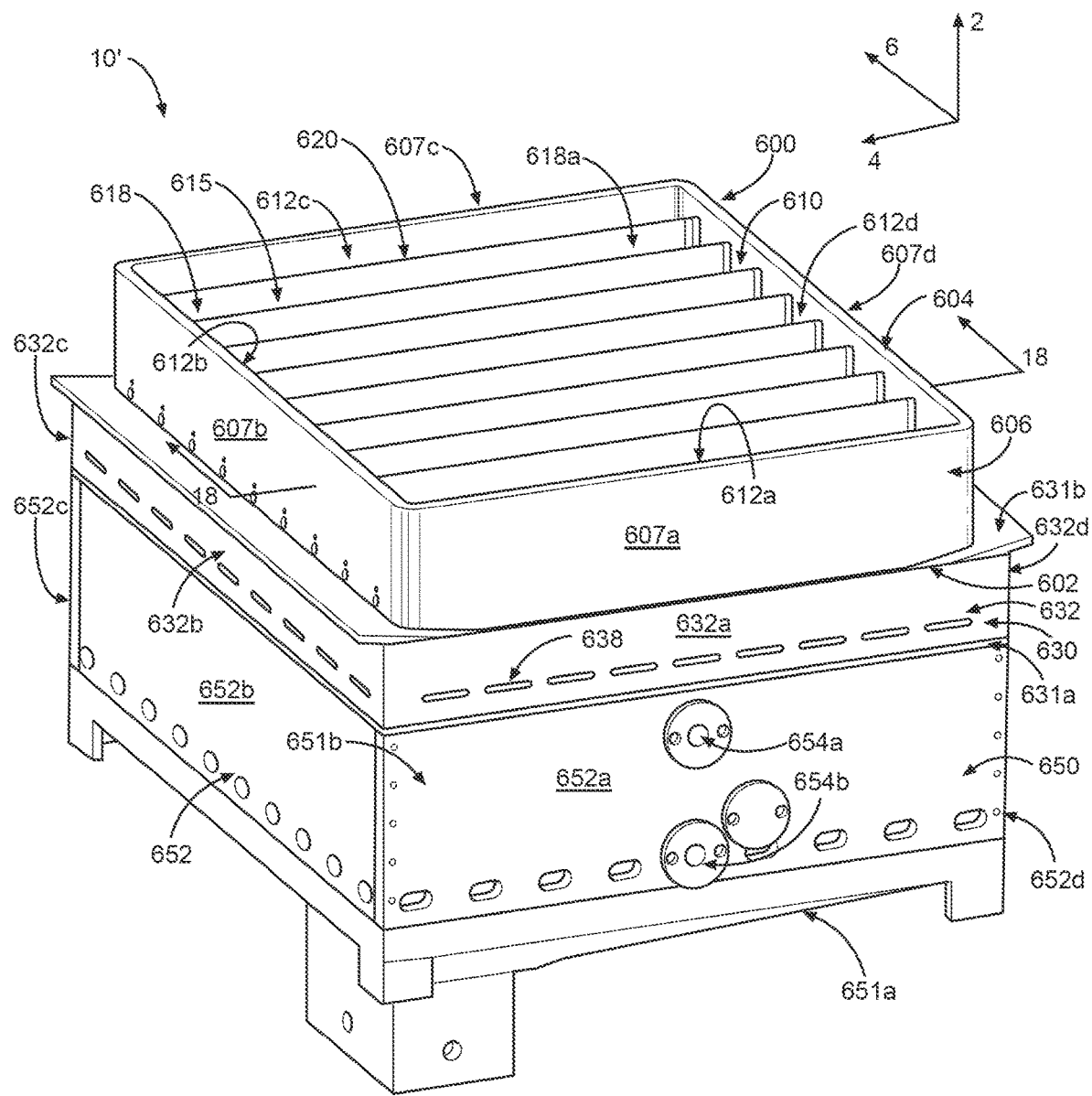
FIG. 17 is a top perspective view of a melt unit according to an embodiment of the present disclosure, with certain elements removed for clarity.
Figure 18:
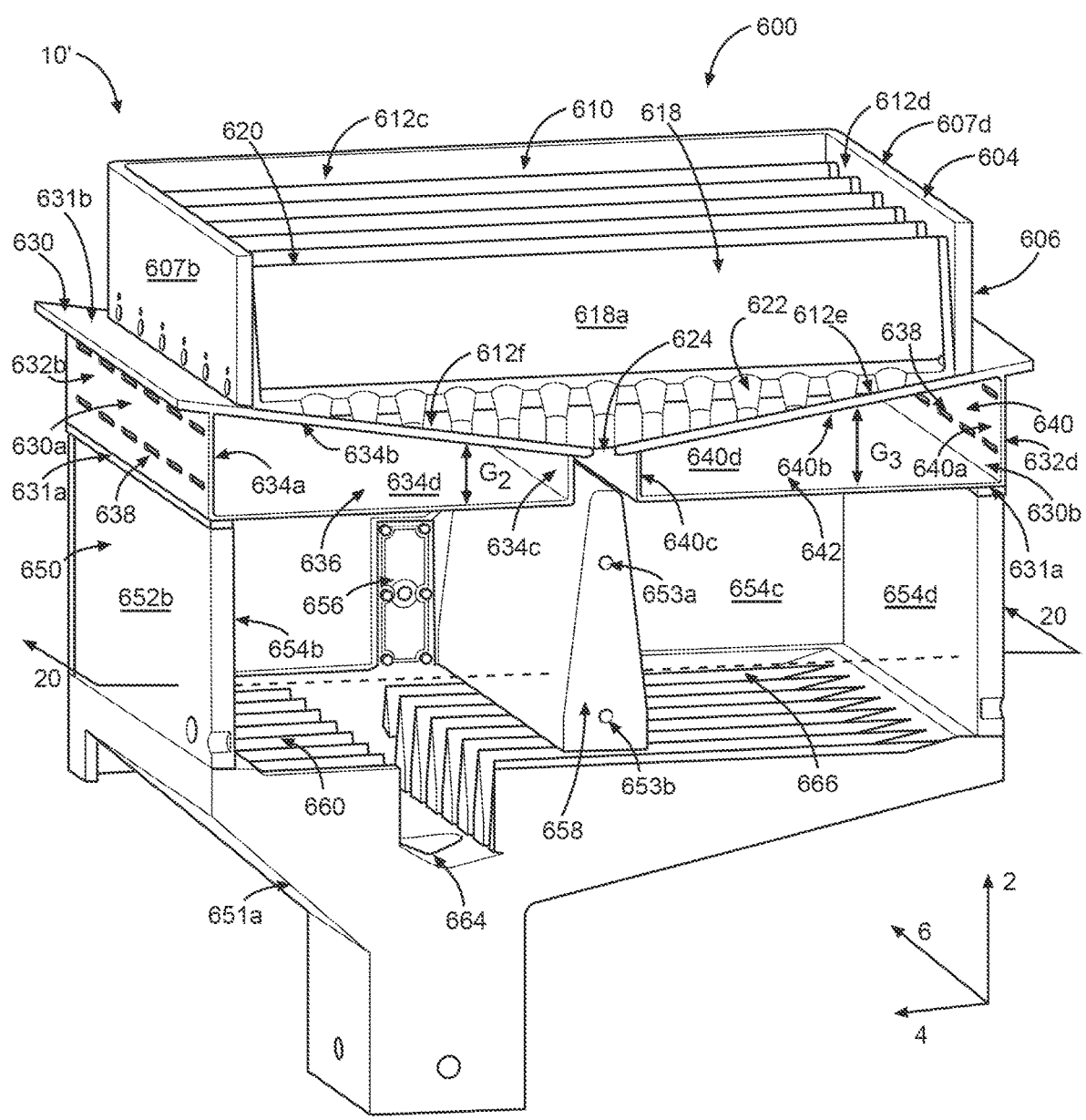
FIG. 18 is a cross-sectional view of the melt grid, isolation chamber, and reservoir shown in FIG. 17 taken along the line 18-18.
Figure 19:
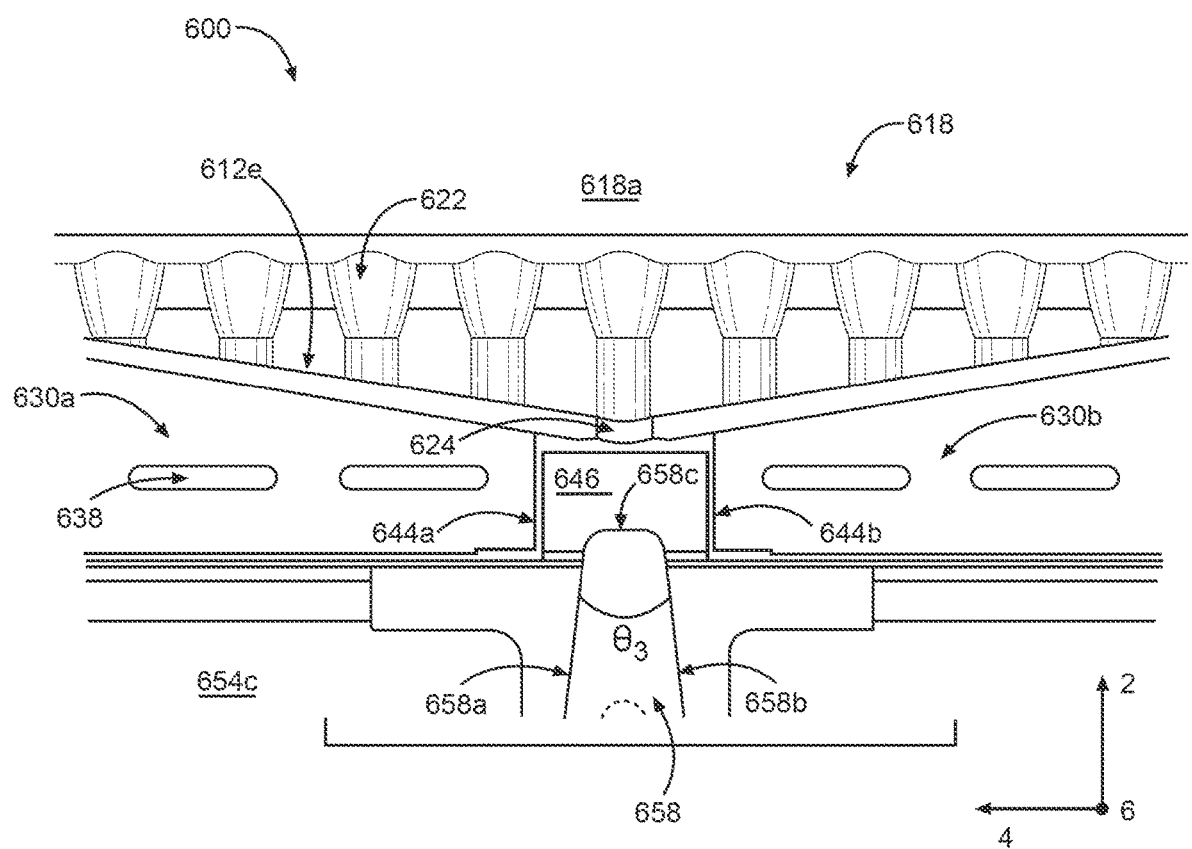
FIG. 19 is an enlarged view of a portion of the cross-sectional view shown in FIG. 18.
Figure 20:
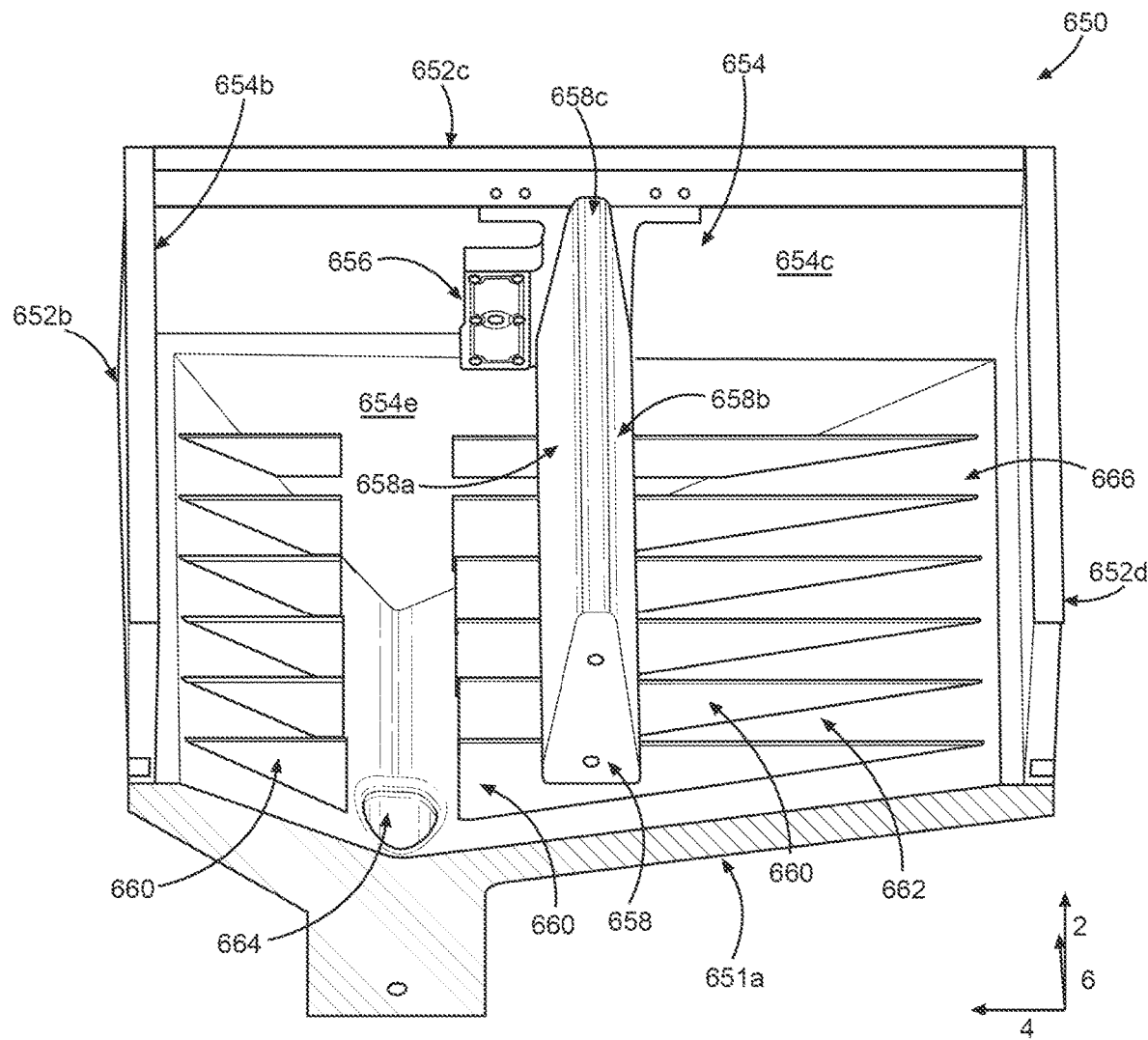
FIG. 20 is a cross-sectional view of the isolation chamber shown in FIG. 17 taken along the line 20-20 shown in FIG. 18.

Now referring to FIG. 12, the guide member can comprise a plurality of guide rods 454. Though a plurality of guide rods 454 can be included in the melting system 10, only one guide rod 454 will be discussed for brevity. The guide rod 454 includes an attachment section 458, a lateral section 462 that extends from the attachment section 458, and a guide section 464 that extends from the lateral section 462. The attachment section 458 and the guide section 464 can extend substantially along the vertical direction 2, although other orientations for these sections are contemplated. Also, the attachment section 458 and the guide section 464 are spaced apart along the lateral and vertical directions 4 and 2. The lateral section 462 is depicted as meeting the guide section 464 at a substantially curved intersection. However, this intersection can define a sharp angle if desired. The lateral section 462 can be angularly offset with respect to the lateral direction 4, such that the lateral section 462 is offset from a plane defined by the lateral and longitudinal directions 4 and 6 by an angle $\alpha_3$. As depicted, the angle $\alpha_3$ is about 45 degrees. However, the angle can be from about 0 degrees to about 90 degrees.

The attachment section 458 can define one or more recesses, such as first and second recesses 456a and 456b. The first and second recesses 456a and 456b can be configured to engage with a corresponding structure (not shown) on the melt grid 100 to attach the guide rod 454 to a portion of the melt grid 100, such as one of the melting rails 128. Though two recesses are shown, the attachment section 458 can include more or less recesses as desired. The lateral section 462 can define an outer surface 463, and the guide section 464 can define an outer surface 465. The outer surface 463 of the lateral section 462 and the outer surface 465 of the guide section 464 can define a substantially continuous surface. The body of the guide rod 454 can be substantially circular, such that the outer surface 463 of the lateral section 462 and the outer surface 465 of the guide section 464 are also substantially circular. However, other shapes of the body of the guide rod 454 are contemplated, such as triangular, rectangular, etc. When the guide rod 454 (or a group of guide rods 454) is attached to the melt grid 100, the lateral section 462 is positioned below the flow passage 142 along the vertical direction 2. A group of guide rails 454 can be attached to a melt grid 100 such that multiple guide rods 454 are positioned below a single flow passage 142, such that the guide rails are spaced apart along the longitudinal direction 6. In operation, molten material M flowing through the flow passage 142 contacts the outer surface 463 of the lateral section 462. From there, the molten material M flows along the outer surface 463 of the lateral section 462, along the outer surface 465 of the guide section 464, and into the reservoir 30.

Continuing with FIGS. 13-16, another embodiment of a guide member will be discussed. In FIGS. 5-12, the various guide members 154, 254, 354, and 454 attached to a portion of the melt grid 100 and extended downward from the melt grid 100, such that at least a portion of the guide members are positioned below the flow passages 142. In contrast, guide member 500 is attached to the reservoir 30 and extends upward toward the melt grid 100, as will be described further below. Though a plurality of guide members 500 can be including in the melting system 10, only one guide member 500 will be discussed below for brevity.

Each guide member 500 can define a first surface 501a and a second surface 501b opposite the first surface 501a, such that the guide member 500 defines a substantially triangular cross section. The first and second surfaces 501a and 501b intersect at a top corner 502, which can define the portion of the guide member 500 that is closest to the melt grid 100. As shown, the top corner 502 can be positioned directly below a passage 49 so that molten material M contacts the top corner 502 after it flows out of the passage 49. The first and second surfaces 501a and 501b can be angularly offset, such that an angle $\theta_2$ is defined between the first and second surfaces 501a and 501b. As depicted, the angle $\theta_2$ can be about 15 degrees. However, the angle $\theta_2$ can alternatively be from about 5 degrees to about 75 degrees, as desired. Though nine guide members 500 are depicted as being included in the melting system 10, more or less guide members 500 can be include as desired.

The melting system 10 can include a plurality of guide members 500 that are spaced apart along the lateral direction 4, such that each guide member 500 is positioned below a respective flow passage 49 of the melt grid 40 along the vertical direction 2. Though the guide members 500 can be differently oriented, they will generally correspond to the orientation of the melting rails 48, and thus the flow passages 49. The guide members 500 can be both positioned below the melting grid 100 along the vertical direction, as well as above the inner surface 33 of the base 32 of the reservoir 30. To support the guide members 500, the melting system 10 can include one or more support bars 504. Each support bar 504 can extend from one side of the inner surface 35 of the wall 39 to the other side, and each guide member 500 can extend from the support bars 504 along the vertical direction 2. Though the support bars 504 are show as extending along the lateral direction 4 and spaced apart along the longitudinal direction 6, the support bars 504 can extend along other directions as desired. The support bars 504 can be alternatively attached to other parts of the reservoir 30, such as the inner surface 33 of the base 32. Also, though four support bars 504 are shown as included in the melting system 10, more or less support bars 504 can be included as desired. For example, the melting system 10 can include only one support bar, two support bars, or more than four support bars. In other embodiments, no support bars may be required, and the guide members 500 can be supported through direct attachment to the inner surface 33 of the base of the reservoir. In operation, molten material M flows through the flow passage 142 of the melt grid 100, and contacts the top corner 502 of the guide members 500, which can be aligned with the flow passages 142 along the lateral direction 4. Then, the molten material M flows along the first and second surface 501a and 501b of the guide members 500, and subsequently flows off the guide members 500 and into the reservoir 30.

Continuing with FIGS. 17-20, another embodiment of a melting system will be discussed. The melting system 10' can include a melt grid 600, an isolation chamber 630, and a reservoir 650 that includes a guide member 658. Similar to the guide member 500, the guide member 658 extends upward toward the melt grid 600, as will be discussed below. The melt grid 600 defines a bottom 602, a top 604 opposite the bottom 602 along the vertical direction 2, and an outer wall 606 that extends between the top 604 and the bottom 602. The bottom 602 of the melt grid 600 is mounted to the top 631b of the isolation chamber 630, while the top 604 of the melt grid 600 is coupled to the lower end 62 of the hopper 60. The melt grid 600 may define a substantially rectangular shape, and thus the outer wall 606 can define four outer sides 607a-607d. Specifically, the outer wall 606 can include a first outer side 607a, a second outer side 607b, a third outer side 607c that is opposite the first outer side 607a along the longitudinal direction 6, and a fourth outer side 607d that is opposite the second outer side 607b along the lateral direction 4. The second and fourth outer sides 607b and 607d extend from the first to the third outer sides 607a and 607c. The melt grid 600 also defines an inner wall 610 opposite the outer wall 606, where the inner wall 610 includes four inner sides 612a-612f. Specifically, the inner wall 610 includes a first inner side 612a, a second inner side 612b, a third inner side 612c opposite the first inner side 612a along the longitudinal direction 6, and a fourth inner side 612d opposite the second inner side 612b along the lateral direction 4. The second and fourth inner sides 612b and 612d can extend from the first inner side 612a to the third inner side 612c. The inner wall 610 can also include a first bottom surface 612e and a second bottom surface 612f opposite the first bottom surface 612e along the lateral direction 4. The first bottom surface 612e extends between the first, second, and third inner sides 612a-612c, while the second bottom surface 612f extends between the first, third, and fourth inner sides 612, 612c, and 612d. Both the first and second bottom surfaces 612e and 612f can extend towards each other along the lateral direction 4 and downwardly along the vertical direction 2, such that the first and second bottom surface 612e and 612f direct a flow of adhesive towards an opening 624 formed between the first and second bottom surfaces 612e and 612f at the center of the melt grid 600, as will be discussed further below.

Like the melt grids 40 and 100, the melt grid 600 includes a plurality of melting rails 618. Though the depicted melt grid 600 includes nine melting rails, the melt grid 600 can include more or less melting rails as desired based upon the particular designs of various melting systems 10' and the requirements of different melting operations. As depicted, each of the melting rails 618 extends from the second inner side 612b to the fourth inner side 612d along the lateral direction 4, with each of the melting rails 618 being spaced apart along the longitudinal direction 6. However, it is also contemplated that the melting rails 618 can extend from the first inner side 612a to the third inner side 612c along the longitudinal direction 6, with each of the melting rails 618 being spaced apart along the lateral direction 4. In either embodiment, the melting rails 618 can extend substantially parallel to each other. Additionally, each of the melting rails 618 can extend from the bottom 602 of the melt grid 600, in particular the first and second bottom surfaces 612e and 612f, toward the top 604 along the vertical direction 2.

Each of the melting rails 618 defines a top corner that defines an uppermost portion of the melting rail 618 along the vertical direction 2. The melting rail 618 further defines a first surface 618a and a second surface (not shown) opposite the first surface 618a along the longitudinal direction 6, where the first surface 618a and the second surface meet at the top corner and extend away from the top corner along the longitudinal and vertical directions 6 and 2. The melting rails 618 are spaced apart from each other such that flow passages 615 are defined between adjacent pairs of melting rails 618. The melting rails 618 also define a plurality of recesses 622 that are spaced apart along the lateral direction 4 and are in communication with the flow passages 615. The first surface 618a and the second surface are configured to contact and transfer heat to the solid material P to transition the solid material P into the molten material M. When transitioned from the solid material P to the molten material M, the molten material M flows through the flow passage 615 and the recesses 622 and to the first and second bottom surfaces 612e and 612f. From there, the molten material M flows along the first and second bottom surfaces 612e and 612f to the center of the melt grid 600 and through the opening 624 formed between the first and second bottom surfaces 612e and 612f.

Continuing with FIGS. 17-20, the isolation chamber 630 is disposed between the melt grid 600 and the reservoir 650. In particular, the isolation chamber 630 defines a top 631b that is attached to the bottom 602 of the melt grid 600, and a bottom 631a opposite the top 631b along the vertical direction 2 that is attached to the top 651b of the reservoir 650. The isolation chamber 630 has an outer wall 632 that can define four outer sides 632a-632d: a first outer side 632a, a second outer side 632b, a third outer side 632c that is opposite the first outer side 632a along the longitudinal direction 6, and a fourth outer side 632d that is opposite the second outer side 632c along the lateral direction 4. The second and fourth outer sides 632b and 632d extend from the first to the third outer sides 632a and 632c.

The isolation chamber 630 further includes two discrete sections separated by a channel 646. The first section 630a has an inner surface 634 that defines a first inner surface 634a, a second inner surface 634b, a third inner surface 634c that is opposite the first inner surface 634a along the lateral direction 4, and a fourth inner surface 634d that is opposite the second inner surface 634b along the vertical direction 2. Collectively, the inner surfaces 634a-634d bound a chamber 636 defined by the first section 630a. The chamber 636 has a height $G_2$ measured from the fourth inner surface 634d to the second inner surface 634b along the vertical direction 2. The height $G_2$ varies along the lateral direction 4 due to the inclination of the second inner surface 634b, which results from the inclination of the second bottom surface 612f of the melt grid 600. The chamber 636 provides an air-insulated buffer between the melt grid 600 and the reservoir 650, such that heat emanating from the molten material M in the reservoir 650 does not affect the solid material P disposed above the melting rails 618 of the melt grid 600. Instead, the molten material M heats the air in the chamber 636, which can escape the isolation chamber 630 through vents 638 that extend through the outer wall 632. Though the vents 638 of the first section 630a are shown as substantially cylindrically-shaped and arranged in a certain configuration, the vents 638 can be any configuration or design as desired. The vents 638 can also extend through any portion of the outer wall 632 as desired.

Similarly, the isolation chamber 630 includes a second section 630b spaced from the first section 630a along the lateral direction 4. The second section 630b has an inner surface 640 that defines a first inner surface 640a, a second inner surface 640b, a third inner surface 640c that is opposite the first inner surface 640a, and a fourth inner surface 640d that is opposite the second inner surface 640b along the vertical direction 2. Collectively, the inner surfaces 640a-640d bound a chamber 642 defined by the second section 630b. The chamber 642 has a height $G_3$ measured form the fourth inner surface 640d to the second inner surface 640b along the vertical direction 2. The height $G_3$ varies along the lateral direction 4 due to the inclination of the second inner surface 640b, which results from the inclination of the first bottom surface 612e of the melt grid 600. Like the chamber 636, the chamber 642 provides an air-insulated buffer between the melt grid 600 and the reservoir 650, such that heat emanating from the molten material M in the reservoir 650 does not affect the solid material P disposed above the melting rails 618 of the melt grid 600. Instead, the molten material M heats the air, which can escape the isolation chamber 630 through vents 638 that extend through the outer wall 632, particularly the fourth outer side 632d and the first inner surface 640a. Though the vents 638 of the second section 630b are shown as substantially cylindrically-shaped and arranged in a certain configuration, the vents 638 can be any configuration or design as desired.

The channel 646, which receives the flow of molten material M flowing through the opening 624, can be centrally disposed in the isolation chamber 630 such that the first and second sections 630a and 630b are equally sized. The channel 646 extends from the top 631b of the isolation chamber 630 to the bottom 631a along the vertical direction 2. The first section 630a can include a first inner wall 644a that partially defines the channel 646, while the second section 630b can include a second inner wall 644b opposite the first inner wall 644a across the channel 646 that also partially defines the channel 646.

Continuing with FIGS. 17-20, the reservoir 650 includes a bottom 651a and a top 651b opposite the bottom 651a along the vertical direction 2, the top 651b being connected to the bottom 631a of the isolation chamber 630. The reservoir 650 also includes an outer wall 652 that includes a plurality of sides: a first side 652a, a second side 652b, a third side 652c that is opposite the first side 652a along the longitudinal direction 6, and a fourth side 652d that is opposite the second side 652b along the lateral direction 4. The reservoir 650 defines a cavity 666 bounded by the outer wall 652, which provides additional thermal insulation between the molten material M in the reservoir 650 and the melt grid 600. The outer wall 652 defines an inner surface 654 along which a level sensor 656 is positioned. The level sensor 656 is used to determine the level of molten material M within the reservoir 650, and provides this reading to the controller 702 through an electrical connection. The inner surface 654 includes a first inner surface 654a, a second inner surface 654b, a third inner surface 654c that is opposite the first inner surface 654a along the longitudinal direction 6, a fourth inner surface 654d that is opposite the second inner surface 654b along the lateral direction 4, and a bottom surface 654e that extends between each of the surfaces 654a-654d. The reservoir 650 also includes a guide member 658 for heating the molten material M within the reservoir 650 and guiding the molten material M as it flows from the channel 646. Though the guide member 658 is depicted as extending from the first inner surface 654a to the third inner surface 654c along the longitudinal direction 6, the guide member 658 can also extend from the second inner surface 654b to the fourth inner surface 654d along the lateral direction 4. The guide member 658 can define a plurality of passages, such as first and second passages 653a and 653b that extend through the guide member 658 from the first side 652a to the third side 652c. Each of the first and second passages 653a and 653b can each be configured to allow a heating element, a heating liquid, or a cooling liquid to pass through the guide member 658 to increase temperature control over the reservoir 650, and likewise the molten material M.

The guide member 658 includes a first surface 658a, a second surface 658b that is opposite the first surface 658a along the lateral direction 4, and a third surface 658c located at the upper end of the guide member 658 that extends from the first surface 658a to the second surface 658b. The guide member 658 is positioned such that the third surface 658c is aligned with, and optionally located within, the channel 646. The first and second surface 658a and 658b can be angled relative to each other by an angle $\theta_3$, such that the cross-sectional shape of the guide member 658 is substantially triangular. As depicted, the angle $\theta_3$ is about 40 degrees. However, it is contemplated that the angle $\theta_3$ can be from about 5 degrees to about 75 degrees. Though depicted as a flat surface with curved edges, it is contemplated that the third surface 658c defines other shapes and configurations. For example, the third surface 658c can be curved, have sharp edges, or define a sharp point between the first and second surfaces 658a and 658b. The guide member 658 can also be spaced from the bottom surface 658e along the vertical direction 2.

The reservoir 650 can include a plurality of fins 660 that extend upwards from the bottom surface 658e along the vertical direction 2. As depicted, each of the fins 660 defines a slender, triangular cross section. However, in other embodiments the fins 660 can be substantially rectangular, or define other shapes as desired. The fins 660 extend along the lateral direction 4, and can extend substantially parallel to each other. The fins 660 are spaced apart from each other, such that passages 662 are defined between each respective pair of adjacent fins 660. The bottom surface 654e can have an outlet 664 that allows molten material M that has accumulated within the reservoir 650 to be transported to an applicator. The bottom surface 654e can be tapered, such that the bottom surface 654e naturally guides molten material M to the outlet 664. The outlet 664 is depicted as positioned laterally off-center within the reservoir 650, though embodiments in which the outlet 664 is centered within the reservoir 650 are contemplated. The fins 660 can be positioned on opposite sides of the outlet 664 along the lateral direction 4, such that none of the fins 660 align with the outlet 664 along the longitudinal direction 6.

As stated above, when transitioned from the solid material P to the molten material M, the molten material M flows through the flow passages 615 and the recesses 622 and to the first and second bottom surfaces 612e and 612f. From there, the molten material M flows along the first and second bottom surfaces 612e and 612f to the center of the melt grid 600 and through the opening 624 formed between the first and second bottom surfaces 612e and 612f. After flowing through the opening 624, the molten material M passes through the channel 646 and contacts the third surface 658c of the guide member 658. From there, the molten material M flows down the guide member 658 along the first and second surfaces 658a and 658b, and either onto the fins 660 or into the passages 662. After flowing along the fins 660 and/or the passages 662, the molten material M is guided by the bottom surface 654e to the outlet 664, from which the molten material M is pumped to an applicator.

As noted above, in previous embodiments of melt grids that do not include guide members, streams of adhesive can swirl or fold upon reaching the reservoir, which can trap air in the adhesive. The inclusion of the guide members 154, 254, 354, 454, and/or 500, as well as the guide member 658 and fins 660, can help prevent aeration of the adhesive from occurring. Upon flowing through the flow passages 142, the hot melt adhesive almost immediately engages the guide members 154, 254, 354, 454, and/or 500, which function to steadily guide the streams of adhesive to the reservoir below. This gradual transition along the guide members 154, 254, 354, 454, and/or 500 prevents the longer free-fall of adhesive from the melt grid to the reservoir that can occur in melting systems that do not include guide members, which can help prevent the adhesive from swirling or folding and thus entrapping pockets of air. Similarly, the guide member 658 and fins 660 help prevent aeration of adhesive, as hot melt adhesive is steadily guided from the channel 646 to the bottom surface 654e by the guide member 658 and fins 660, as opposed to the molten material M free-falling from the channel 646 to a pool of adhesive below. As a result, preventing adhesive aeration can help ensure adhesive pattern quality from the applicator is preserved.

The guide member 658 is a purpose heated zone, which reduces the viscosity of the molten and semi-molten material as it flows across the heated surfaces, allowing the fluid film to thin out and disperse across the full face of the guide member 658. This lower viscosity and film thinning phenomenon causes an elongation and popping of air bubbles that may be present, which supplements the primary aeration prevention realized thru the elimination of the swirling streams that entrap air as discussed above.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A melt unit, comprising:
   a reservoir for receiving molten material;
   a hopper for receiving solid material; and
   a melt grid disposed between the hopper and the reservoir, wherein the melt grid heats the solid material into the molten material, the melt grid comprising:
   a plurality of elongated melting rails that extend along a longitudinal direction, wherein each of the plurality of elongated melting rails is spaced apart along a lateral direction that is perpendicular to the longitudinal direction;
   a plurality of flow channels, wherein each of the plurality of flow channels extends between a respective two melting rails of the plurality of elongated melting rails; and
   a plurality of guide members, wherein each of the plurality of guide members are positioned below the plurality of flow channels and the plurality of elongated melting rails with a vertical gap therebetween along a vertical direction that is perpendicular to the lateral and longitudinal directions, such that the molten material flows through the plurality of flow channels, across the vertical gap, and along respective flow surfaces of the plurality of guide members as the molten material flows from the hopper to the reservoir.

2. The melt unit of claim 1, wherein each of the plurality of guide members defines a curved guide wall having a semi-circular shape that extends between a first guide wall and a second guide wall wherein 1) each of the first and second guide walls extends downward from the curved guide wall along the vertical direction and 2) the first and second guide walls are spaced apart along the lateral direction.

3. The melt unit of claim 2, wherein the curved guide wall defines an inner curved surface and an outer curved surface opposite the inner curved surface, the first guide wall defines an inner surface and an outer surface opposite the inner surface, and the second guide wall defines an inner surface and an outer surface opposite the inner surface, wherein the inner surfaces of the first and second guide walls face each other, and each of the respective flow surfaces includes the outer curved surface of the curved guide wall and the outer surfaces of the first and second guide walls.

4. The melt unit of claim 2, wherein each of the plurality of guide members includes a first attachment wall and a second attachment wall opposite the first attachment wall along the longitudinal direction, wherein the first attachment wall and the second attachment wall secure the plurality of guide members to an inner wall of the melt grid, and wherein the vertical gap separates the plurality of guide members from the plurality of flow channels along the vertical direction.

5. The melt unit of claim 1, wherein each of the plurality of guide members defines an attachment wall, a lateral wall extending from the attachment wall, and a guide wall extending from the lateral wall, such that the attachment wall and the guide wall are spaced apart along the lateral and vertical directions.

6. The melt unit of claim 5, wherein the lateral wall extends along a direction that is angularly offset from the lateral direction by an angle that is about 25 degrees, and the guide wall extends substantially along the vertical direction.

7. The melt unit of claim 5, wherein the lateral wall and the guide wall meet at an intersection that is substantially curved.

8. The melt unit of claim 5, the attachment wall of each of the plurality of guide members is attached to a respective one of the plurality of elongated melting rails.

9. The melt unit of claim 5, wherein the guide wall is substantially rectangular.

10. The melt unit of claim 5, wherein the guide wall defines a plurality of guide tabs, wherein each of the plurality of guide tabs of a respective one of the plurality of guide members is spaced apart along the longitudinal direction, such that two adjacent guide tabs of the plurality of guide tabs define a gap therebetween.

11. The melt unit of claim 10, wherein each of the plurality of guide tabs is substantially triangular.

12. The melt unit of claim 5, wherein the lateral wall defines a top surface and a bottom surface and the guide wall defines an inner surface and an outer surface, wherein respective flow surfaces of the plurality of guide members includes the top surface of the lateral wall and the inner surface of the guide wall.

13. The melt unit of claim 1, wherein each of the plurality of guide members is a guide rod that defines an attachment section, a lateral section extending from the attachment section, and a guide section extending from the attachment section, such that the attachment section and the guide section are spaced apart along the lateral and vertical directions.

14. The melt unit of claim 13, wherein the lateral section extends along a direction that is angularly offset from the lateral direction by an angle that is about 45 degrees, and the guide section extends substantially along the vertical direction.

15. The melt unit of claim 13, wherein the plurality of guide members includes a first group of guide members, wherein the attachment section of each of the first group of guide members is attached to one of the plurality of elongated melting rails such that the first group of guide members is spaced apart along the longitudinal direction.

16. The melt unit of claim 13, wherein the lateral section and the guide section of each of the plurality of guide members each defines a respective circular outer surface, wherein the respective flow surfaces of the plurality of guide members includes the circular outer surfaces of the lateral section and the guide section.

17. A melt unit, comprising:
a reservoir for receiving molten material, the reservoir including a base and a top opposite the base along a vertical direction, the top defining an outer wall that defines an inner surface, the reservoir further including a plurality of support bars attached to the inner surface of the outer wall and a plurality of guide members extending upward from the plurality of support bars along the vertical direction, wherein the plurality of guide members are spaced apart along a lateral direction that is perpendicular to the vertical direction and the plurality of support bars are spaced apart along a longitudinal direction that is perpendicular to the vertical and lateral directions;
a hopper for receiving solid material; and
a melt grid disposed between the hopper and the reservoir, wherein the melt grid heats the solid material into the molten material, the melt grid comprising:
a plurality of elongated melting rails that extend along the longitudinal direction and are spaced apart along the lateral direction; and
a plurality of flow channels, wherein each of the plurality of flow channels extends between two melting rails of the plurality of elongated melting rails,
wherein the plurality of guide members are positioned vertically below the plurality of flow channels with a vertical gap therebetween such that the molten material flows through the plurality of flow channels, across the vertical gap, and along the plurality of guide members as the molten material flows to the reservoir.

18. The melt unit of claim 17, wherein the plurality of guide members are spaced from and positioned below the melt grid along the vertical direction with the vertical gap therebetween.

19. The melt unit of claim 17, wherein the base of the reservoir defines an inner surface, and the plurality of guide members and the plurality of support bars are spaced from and positioned above the inner surface of the base along the vertical direction; and wherein the vertical gap separates the plurality of guide members from the melt grid along the vertical direction.

20. The melt unit of claim 17, wherein each of the plurality of guide members defines a first surface and a second surface that extend upwards along the vertical direction from the plurality of support bars to a top corner, and the molten material flows along the first surface and the second surface of the plurality of guide members as the molten material flows to the reservoir.

21. The melt unit of claim 20, wherein the top corner of each of the plurality of guide members is positioned below and laterally aligned with a respective one of the plurality of flow channels.

22. The melt unit of claim 20, wherein the first surface and the second surface are angularly offset by an angle that is between about 5 degrees and 75 degrees, such that each of the plurality of guide members defines a substantially triangular cross section.

23. A melt unit, comprising:
a reservoir for receiving molten material, the reservoir including an outer wall that has an inner surface and a guide member that extends from a first part of the inner surface to a second part of the inner surface that is opposite the first part;
a hopper for receiving solid material; and
a melt grid disposed between the hopper and the reservoir, wherein the melt grid heats the solid material into the molten material, the melt grid comprising:
a plurality of elongated melting rails that extend along a longitudinal direction and are spaced apart along a lateral direction that is perpendicular to the longitudinal direction;
a plurality of flow channels, wherein each of the plurality of flow channels extends between two melting rails of the plurality of elongated melting rails; and
an opening that is in fluid communication with the reservoir and each of the plurality of flow channels,
wherein the guide member is positioned vertically below the plurality of flow channels and vertically below the opening along a transverse direction that is perpendicular to the longitudinal and lateral directions and aligned with the opening along the transverse direction, and wherein the molten material flows through the plurality of flow channels, through the opening, across a vertical gap, and along the guide member as the molten material flows to the reservoir.

24. The melt unit of claim 23, further comprising an isolation chamber positioned between the melt grid and the reservoir, wherein the isolation chamber defines a first chamber, a second chamber spaced from the first chamber along the lateral direction, and a channel that extends between the first chamber and the second chamber, wherein the channel is in fluid communication with the opening and the reservoir.

25. The melt unit of claim 24, wherein the isolation chamber defines an outer wall and a plurality of vents that extend through the outer wall, such that each of the plurality of vents is open to one of the first chamber and the second chamber.

26. The melt unit of claim 23, wherein the guide member extends in the longitudinal direction, the reservoir further comprising:
a plurality of fins that extend from a bottom of the inner surface along the transverse direction, wherein the plurality of fins are each spaced below the guide member along the transverse direction.

27. The melt unit of claim 23, further comprising:
a level sensor attached to the inner surface of the reservoir.

28. The melt unit of claim 1, wherein the molten material comprises completely molten material and wherein the plurality of guide members are configured to guide the completely molten material exiting the plurality of flow channels between the plurality of elongated melting rails into the reservoir.

29. The melt unit of claim 1, wherein the plurality of guide members are configured to reduce formation of aeration as the molten material flows into the reservoir.

30. The melt unit of claim 29, wherein the aeration comprises at least one air bubble.

31. The melt unit of claim 17, wherein the molten material comprises completely molten material and wherein the plurality of guide members are configured to guide the completely molten material exiting the plurality of flow channels between the plurality of elongated melting rails into the reservoir.

32. The melt unit of claim 17, wherein the plurality of guide members are configured to reduce formation of aeration as the molten material flows into the reservoir.

33. The melt unit of claim 32, wherein the aeration comprises at least one air bubble.

34. The melt unit of claim 23, the molten material comprises completely molten material and wherein the guide member is configured to guide the completely molten material exiting at least one of the flow channels between the plurality of elongated melting rails into the reservoir.

35. The melt unit of claim 23, wherein the guide member is configured to reduce formation of aeration as the molten material flows into the reservoir.

36. The melt unit of claim 35, wherein the aeration comprises at least one air bubble.

* * * * *